United States Patent
Lanni

(10) Patent No.: US 10,951,042 B2
(45) Date of Patent: Mar. 16, 2021

(54) POWER SUPPLY SYSTEMS

(71) Applicant: COMARCO WIRELESS SYSTEMS LLC, Dripping Springs, TX (US)

(72) Inventor: Thomas W. Lanni, Laguna Niguel, CA (US)

(73) Assignee: COMARCO WIRELESS SYSTEMS LLC, Dripping Springs, TX (US)

( * ) Notice: Subject to any disclaimer, the term of this patent is extended or adjusted under 35 U.S.C. 154(b) by 0 days.

(21) Appl. No.: 17/077,699

(22) Filed: Oct. 22, 2020

(65) Prior Publication Data

US 2021/0044118 A1 Feb. 11, 2021

Related U.S. Application Data

(60) Continuation of application No. 16/991,295, filed on Aug. 12, 2020, now Pat. No. 10,855,087, which is a continuation of application No. 16/601,447, filed on Oct. 14, 2019, now Pat. No. 10,855,086, which is a continuation of application No. 15/462,083, filed on Mar. 17, 2017, now abandoned, which is a continuation of application No. 14/736,885, filed on Jun. 11, 2015, now Pat. No. 9,601,922, which is a division of application No. 13/461,149, filed on May
(Continued)

(51) Int. Cl.
*H01R 29/00* (2006.01)
*H02J 7/00* (2006.01)

(52) U.S. Cl.
CPC ............... *H02J 7/00* (2013.01); *H01R 29/00* (2013.01)

(58) Field of Classification Search
CPC .................................. H02J 7/00; H01R 29/00
See application file for complete search history.

(56) References Cited

U.S. PATENT DOCUMENTS

| 339,103 A | 3/1886 | Husssey |
| 359,474 A | 3/1887 | Smith |

(Continued)

FOREIGN PATENT DOCUMENTS

| CN | 1747058 A | 3/2006 |
| CN | 1961378 A | 5/2007 |

(Continued)

OTHER PUBLICATIONS

Radio Shack 1990 Catalog, cover page and p. 151, 1990.
(Continued)

*Primary Examiner* — Daniel J Cavallari

(57) ABSTRACT

Exemplary power supply systems according to the present invention include circuitry that is configured to provide DC power and configured to receive a input signal that originates from a portable electronic device (the "PED") and to provide a output signal to be sent to the PED. Such circuitry is configured to be coupled to the PED via a connector having a first, second, third, and fourth conductor. Such a connector is configured to be detachably mated with a power input interface of the PED to transfer the DC power to the PED, a ground reference to the PED, the input signal from the PED to the circuitry and, in coordination with the input signal, the output signal from the circuitry to the PED, which is usable by the PED in connection with control of charging a battery of the PED based on the DC power provided by the circuitry.

20 Claims, 14 Drawing Sheets

Related U.S. Application Data 1, 2012, now Pat. No. 9,153,960, which is a continuation-in-part of application No. 13/209,636, filed on Aug. 15, 2011, now Pat. No. 8,330,303, which is a continuation of application No. 12/840,952, filed on Jul. 21, 2010, now Pat. No. 7,999,412, which is a continuation-in-part of application No. 11/604,950, filed on Nov. 28, 2006, now Pat. No. 7,868,486, which is a continuation-in-part of application No. 10/758,933, filed on Jan. 15, 2004, now Pat. No. 7,453,171.

(56) References Cited

U.S. PATENT DOCUMENTS

| | | |
|---|---|---|
| 375,936 A | 1/1888 | Harwood |
| 391,227 A | 10/1888 | Buckman |
| 1,386,884 A | 8/1921 | McKay |
| 1,741,265 A | 12/1929 | Wappler |
| 2,427,111 A | 9/1947 | Tolmie |
| 2,792,559 A | 5/1957 | Maberry |
| 2,914,704 A | 11/1959 | Joseph et al. |
| 3,027,507 A | 3/1962 | Hubner |
| 3,048,805 A | 8/1962 | Berni |
| 3,049,687 A | 8/1962 | Berni |
| 3,111,641 A | 11/1963 | Wilentchik |
| 3,134,631 A | 5/1964 | Whalen |
| 3,201,617 A | 8/1965 | Pacoroni et al. |
| 3,256,466 A | 6/1966 | Trolio et al. |
| 3,275,855 A | 9/1966 | Wright |
| 3,281,747 A | 10/1966 | Winsand |
| 3,452,215 A | 6/1969 | Alessio |
| 3,484,864 A | 12/1969 | Bernstein et al. |
| 3,581,480 A | 6/1971 | O'Connor et al. |
| 3,659,188 A | 4/1972 | Alexander et al. |
| 3,784,956 A | 1/1974 | Gassman |
| 3,870,946 A | 3/1975 | Sandorf |
| 3,958,849 A | 5/1976 | Blairsdale |
| 3,978,465 A | 8/1976 | Goode |
| 3,996,546 A | 12/1976 | Hugly |
| 4,021,933 A | 5/1977 | Hughes |
| 4,075,458 A | 2/1978 | Moyer |
| 4,083,246 A | 4/1978 | Marsh |
| 4,089,041 A | 5/1978 | Lockard |
| 4,116,524 A | 9/1978 | Denigris et al. |
| 4,164,665 A | 8/1979 | Berger |
| 4,176,254 A | 11/1979 | Dluehosh et al. |
| 4,220,834 A | 9/1980 | Holce et al. |
| 4,239,319 A | 12/1980 | Gladd et al. |
| 4,257,080 A | 3/1981 | Bartram et al. |
| 4,257,089 A | 3/1981 | Ravis |
| 4,258,969 A | 3/1981 | Stallard |
| 4,297,623 A | 10/1981 | Dupont |
| 4,307,441 A | 12/1981 | Bello |
| 4,342,563 A | 8/1982 | Campbell |
| 4,368,942 A | 1/1983 | Mathe et al. |
| 4,386,333 A | 5/1983 | Dillan |
| 4,415,959 A | 11/1983 | Vinciarelli |
| 4,442,382 A | 4/1984 | Fleck |
| 4,467,263 A | 8/1984 | Conforti et al. |
| 4,569,009 A | 2/1986 | Genuit |
| 4,622,627 A | 11/1986 | Rodriguez et al. |
| 4,626,052 A | 12/1986 | Rumble |
| 4,697,070 A | 9/1987 | Kai |
| 4,709,160 A | 11/1987 | Kinoshita |
| 4,709,972 A | 12/1987 | Labudde et al. |
| 4,713,601 A | 12/1987 | Zahm et al. |
| 4,713,642 A | 12/1987 | Wolfe et al. |
| 4,720,849 A | 1/1988 | Tayama |
| 4,734,839 A | 3/1988 | Barthold |
| 4,747,034 A | 5/1988 | Dickey |
| 4,764,129 A | 8/1988 | Jones et al. |
| 4,820,204 A | 4/1989 | Batty |
| 4,829,224 A | 5/1989 | Gandelman et al. |
| RE32,977 E | 7/1989 | Gotoh et al. |
| 4,860,185 A | 8/1989 | Brewer et al. |
| 4,885,674 A | 12/1989 | Varga et al. |
| 4,890,214 A | 12/1989 | Yamamoto |
| 4,900,885 A | 2/1990 | Inumada |
| 4,912,392 A | 3/1990 | Faulkner |
| 4,924,067 A | 5/1990 | Wilhelmson |
| 4,963,802 A | 10/1990 | Gross et al. |
| 4,967,138 A | 10/1990 | Obergfell et al. |
| 4,990,099 A | 2/1991 | Marin et al. |
| 4,997,381 A | 3/1991 | Oh |
| 4,997,393 A | 3/1991 | Armando |
| 5,006,695 A | 4/1991 | Elliott |
| 5,007,863 A | 4/1991 | Xuan |
| 5,016,269 A | 5/1991 | Rogers |
| 5,019,954 A | 5/1991 | Bourgeault et al. |
| 5,040,990 A | 8/1991 | Suman et al. |
| 5,044,964 A | 9/1991 | Minerd et al. |
| 5,060,130 A | 10/1991 | Steigerwald |
| 5,084,666 A | 1/1992 | Bolash |
| 5,086,509 A | 2/1992 | Inubushi et al. |
| 5,089,768 A | 2/1992 | Sato |
| 5,092,788 A | 3/1992 | Pristupa et al. |
| 5,119,283 A | 6/1992 | Steigerwald et al. |
| 5,127,844 A | 7/1992 | Leman et al. |
| 5,146,394 A | 9/1992 | Ishii et al. |
| 5,147,226 A | 9/1992 | Kile |
| 5,150,278 A | 9/1992 | Lynes et al. |
| 5,164,652 A | 11/1992 | Johnson et al. |
| 5,170,067 A | 12/1992 | Baum et al. |
| 5,177,431 A | 1/1993 | Smith et al. |
| 5,177,675 A | 1/1993 | Archer |
| 5,181,859 A | 1/1993 | Foreman et al. |
| 5,184,291 A | 2/1993 | Crowe et al. |
| 5,200,685 A | 4/1993 | Sakamoto |
| 5,233,509 A | 8/1993 | Ghotbi |
| D339,103 S | 9/1993 | Dickey |
| 5,245,220 A | 9/1993 | Lee |
| 5,254,931 A | 10/1993 | Martensson |
| 5,258,888 A | 11/1993 | Korinsky |
| 5,259,800 A | 11/1993 | Fields et al. |
| 5,262,762 A | 11/1993 | Westover et al. |
| 5,283,727 A | 2/1994 | Kheraluwala et al. |
| 5,290,191 A | 3/1994 | Foreman et al. |
| 5,295,058 A | 3/1994 | McGreevy |
| 5,309,348 A | 5/1994 | Leu |
| 5,315,769 A | 5/1994 | Barry et al. |
| 5,326,283 A | 7/1994 | Chen |
| 5,333,177 A | 7/1994 | Braitberg et al. |
| 5,339,213 A | 8/1994 | O'Callaghan |
| 5,345,592 A | 9/1994 | Woodmas |
| 5,347,211 A | 9/1994 | Jakubowski |
| 5,350,993 A | 9/1994 | Toya et al. |
| 5,369,352 A | 11/1994 | Toepfer et al. |
| 5,401,178 A | 3/1995 | Liu |
| 5,412,248 A | 5/1995 | Murari et al. |
| 5,414,610 A | 5/1995 | Brainard |
| 5,417,585 A | 5/1995 | Morin et al. |
| 5,420,496 A | 5/1995 | Ishikawa |
| D359,474 S | 6/1995 | Palatov |
| 5,428,288 A | 6/1995 | Foreman et al. |
| 5,442,540 A | 8/1995 | Hua et al. |
| 5,449,302 A | 9/1995 | Yarbrough et al. |
| 5,455,734 A | 10/1995 | Foreman et al. |
| 5,471,117 A | 11/1995 | Ranganath et al. |
| 5,479,331 A | 12/1995 | Lenni |
| 5,490,037 A | 2/1996 | Clancy |
| 5,494,449 A | 2/1996 | Chioo |
| 5,499,187 A | 3/1996 | Smith |
| 5,502,618 A | 3/1996 | Chiou |
| 5,506,490 A | 4/1996 | Demuro |
| 5,510,691 A | 4/1996 | Palatov |
| 5,519,570 A | 5/1996 | Chung |
| 5,532,524 A | 7/1996 | Townsley et al. |
| 5,534,765 A | 7/1996 | Kreisinger et al. |
| 5,539,615 A | 7/1996 | Sellers |
| 5,559,422 A | 9/1996 | Fahrenkrug et al. |
| 5,570,002 A | 10/1996 | Castleman |
| D375,936 S | 11/1996 | Palatov |
| 5,573,425 A | 11/1996 | Morisawa et al. |

(56) References Cited

U.S. PATENT DOCUMENTS

| | | |
|---|---|---|
| 5,583,776 A | 12/1996 | Levi et al. |
| 5,589,762 A | 12/1996 | Iannuzo |
| 5,593,323 A | 1/1997 | Dernehl |
| 5,594,318 A | 1/1997 | Nor et al. |
| 5,598,327 A | 1/1997 | Somerville et al. |
| 5,602,455 A | 2/1997 | Stephens et al. |
| 5,602,462 A | 2/1997 | Stich et al. |
| 5,606,242 A | 2/1997 | Hull et al. |
| 5,611,701 A | 3/1997 | Hahn |
| 5,612,927 A | 3/1997 | Morrison et al. |
| 5,613,863 A | 3/1997 | Klaus et al. |
| 5,615,344 A | 3/1997 | Corder |
| 5,621,299 A | 4/1997 | Krall |
| 5,628,641 A | 5/1997 | Hahn |
| 5,636,110 A | 6/1997 | Lanni |
| 5,644,623 A | 7/1997 | Gulledge |
| 5,648,711 A | 7/1997 | Hakkarainen |
| 5,648,712 A | 7/1997 | Hahn |
| 5,649,001 A | 7/1997 | Thomas et al. |
| 5,663,589 A | 9/1997 | Saitoh et al. |
| 5,672,951 A | 9/1997 | Shiota |
| 5,673,169 A | 9/1997 | Wicks |
| 5,694,024 A | 12/1997 | Dias et al. |
| 5,701,338 A | 12/1997 | Leyen et al. |
| 5,703,467 A | 12/1997 | Patino |
| D391,227 S | 2/1998 | Dickey |
| 5,714,805 A | 2/1998 | Lobaugh |
| 5,715,153 A | 2/1998 | Lu |
| 5,715,156 A | 2/1998 | Yilmaz et al. |
| 5,717,318 A | 2/1998 | Matsuda et al. |
| 5,721,481 A | 2/1998 | Narita et al. |
| 5,726,858 A | 3/1998 | Smith et al. |
| 5,731,693 A | 3/1998 | Furmanczyk |
| 5,733,674 A | 3/1998 | Law et al. |
| 5,735,619 A | 4/1998 | Myint |
| 5,736,830 A | 4/1998 | Weng |
| 5,739,672 A | 4/1998 | Lane |
| 5,739,673 A | 4/1998 | Le Van Suu |
| 5,754,395 A | 5/1998 | Hsu et al. |
| 5,770,895 A | 6/1998 | Kumasaka |
| 5,773,961 A | 6/1998 | Cameron et al. |
| 5,777,350 A | 7/1998 | Nakamura et al. |
| 5,783,926 A | 7/1998 | Moon et al. |
| 5,790,896 A | 8/1998 | Nguyen |
| 5,801,513 A | 9/1998 | Smith et al. |
| 5,801,881 A | 9/1998 | Lanni et al. |
| 5,818,360 A | 10/1998 | Chu et al. |
| 5,822,200 A | 10/1998 | Stasz |
| 5,828,605 A | 10/1998 | Peng et al. |
| 5,832,988 A | 11/1998 | Mistry et al. |
| 5,836,783 A | 11/1998 | Morisawa et al. |
| 5,838,110 A | 11/1998 | Pezzani |
| 5,838,554 A | 11/1998 | Lanni |
| 5,847,541 A | 12/1998 | Hahn |
| 5,847,545 A | 12/1998 | Chen et al. |
| 5,861,729 A | 1/1999 | Maeda et al. |
| 5,861,732 A | 1/1999 | Takimoto et al. |
| 5,864,221 A | 1/1999 | Downs et al. |
| 5,867,379 A | 2/1999 | Maksimovic et al. |
| 5,885,017 A | 3/1999 | Hultzman et al. |
| 5,886,422 A | 3/1999 | Mills |
| 5,890,061 A | 3/1999 | Timm et al. |
| 5,901,056 A | 5/1999 | Hung |
| 5,912,544 A | 6/1999 | Miyakawa et al. |
| 5,926,762 A | 7/1999 | Arpee et al. |
| 5,929,597 A | 7/1999 | Pfeifer et al. |
| 5,939,856 A | 8/1999 | Demuro et al. |
| 5,940,282 A | 8/1999 | Oglesbee |
| 5,946,202 A | 8/1999 | Balogh |
| 5,949,213 A | 9/1999 | Lanni |
| 5,955,797 A | 9/1999 | Kim |
| 5,967,807 A | 10/1999 | Wu |
| 5,969,438 A | 10/1999 | Odaohara |
| 5,977,747 A | 11/1999 | Huang |
| 5,982,652 A | 11/1999 | Simonelli et al. |
| 6,005,773 A | 12/1999 | Rozman et al. |
| 6,005,781 A | 12/1999 | Balakirshnan |
| 6,008,998 A | 12/1999 | Han |
| 6,040,646 A | 3/2000 | Peters |
| 6,049,473 A | 4/2000 | Jang et al. |
| 6,054,846 A | 4/2000 | Castleman |
| 6,055,097 A | 4/2000 | Lanni et al. |
| 6,057,610 A | 5/2000 | Nierescher |
| 6,058,034 A | 5/2000 | Cummings et al. |
| 6,059,843 A | 5/2000 | Kirkhart |
| 6,064,177 A | 5/2000 | Dixon |
| 6,067,309 A | 5/2000 | Onomura et al. |
| 6,071,156 A | 6/2000 | Platzer et al. |
| 6,080,022 A | 6/2000 | Shaberman et al. |
| 6,088,588 A | 7/2000 | Osborne |
| 6,089,886 A | 7/2000 | Mareno |
| 6,091,611 A | 7/2000 | Lanni |
| 6,101,090 A | 8/2000 | Gates |
| 6,108,218 A | 8/2000 | Igarashi et al. |
| 6,126,460 A | 10/2000 | Wu |
| 6,132,391 A | 10/2000 | Onari et al. |
| 6,135,831 A | 10/2000 | Lanni et al. |
| 6,137,280 A | 10/2000 | Ackermann et al. |
| 6,152,792 A | 11/2000 | Lanni et al. |
| 6,160,873 A | 12/2000 | Truong et al. |
| 6,166,527 A | 12/2000 | Dwelley et al. |
| 6,172,884 B1 | 1/2001 | Lanni |
| 6,172,891 B1 | 1/2001 | O'Neal et al. |
| 6,179,633 B1 | 1/2001 | Inada |
| 6,181,079 B1 | 1/2001 | Chang et al. |
| 6,191,552 B1 | 2/2001 | Kates et al. |
| 6,191,553 B1 | 2/2001 | Feng-Jung |
| 6,191,565 B1 | 2/2001 | Lee et al. |
| 6,194,875 B1 | 2/2001 | Takimoto et al. |
| 6,198,250 B1 | 3/2001 | Gartstein et al. |
| 6,201,376 B1 | 3/2001 | Mweene et al. |
| 6,218,207 B1 | 4/2001 | Itoh et al. |
| 6,225,708 B1 | 5/2001 | Furukawa et al. |
| 6,238,257 B1 | 5/2001 | Platzer et al. |
| 6,241,538 B1 | 6/2001 | Chen |
| 6,257,932 B1 | 7/2001 | Neely |
| 6,266,261 B1 | 7/2001 | Lanni |
| 6,266,514 B1 | 7/2001 | O'Donnell |
| 6,268,711 B1 | 7/2001 | Bearfield |
| 6,288,522 B1 | 9/2001 | Odaohhara et al. |
| 6,297,972 B1 | 10/2001 | Chen |
| 6,301,115 B1 | 10/2001 | Hashimoto et al. |
| 6,302,726 B1 | 10/2001 | Marechal |
| 6,302,744 B1 | 10/2001 | Nomura |
| 6,307,757 B1 | 10/2001 | Porter et al. |
| 6,312,271 B1 | 11/2001 | Tseng |
| 6,350,666 B2 | 2/2002 | Kryliouk |
| D454,537 S | 3/2002 | O'Connor et al. |
| 6,358,096 B1 | 3/2002 | Beckman |
| 6,360,177 B1 | 3/2002 | Curt et al. |
| 6,361,355 B1 | 3/2002 | Matsuoka et al. |
| 6,368,155 B1 | 4/2002 | Bassler et al. |
| 6,382,842 B1 | 5/2002 | Arima et al. |
| 6,418,791 B1 | 7/2002 | Lanni et al. |
| 6,429,622 B1 | 8/2002 | Svensson |
| 6,433,274 B1 | 8/2002 | Doss et al. |
| 6,434,029 B1 | 8/2002 | Cyr et al. |
| 6,449,176 B1 | 9/2002 | Kakuda |
| 6,449,211 B1 | 9/2002 | Jungroth et al. |
| 6,456,184 B1 | 9/2002 | Vu et al. |
| 6,459,175 B1 | 10/2002 | Potega |
| 6,459,597 B1 | 10/2002 | Igarashi et al. |
| 6,469,895 B1 | 10/2002 | Smith et al. |
| 6,473,318 B1 | 10/2002 | Qian et al. |
| 6,473,961 B1 | 11/2002 | Segal et al. |
| 6,483,730 B2 | 11/2002 | Johnson, Jr. |
| 6,487,074 B1 | 11/2002 | Kimura et al. |
| 6,490,181 B1 | 12/2002 | Liu et al. |
| 6,502,777 B2 | 1/2003 | Liao |
| 6,504,343 B1 | 1/2003 | Chang |
| 6,504,463 B1 | 1/2003 | Kato et al. |
| 6,507,173 B1 | 1/2003 | Spiridon et al. |
| 6,528,970 B1 | 3/2003 | Liu et al. |
| 6,540,549 B2 | 4/2003 | Rupert |

(56) References Cited

U.S. PATENT DOCUMENTS

| | | |
|---|---|---|
| 6,563,726 B1 | 5/2003 | Hirst |
| 6,585,530 B2 | 7/2003 | Steiert et al. |
| 6,597,565 B1 | 7/2003 | Kluth et al. |
| 6,604,241 B1 | 8/2003 | Haeri et al. |
| 6,628,106 B1 | 9/2003 | Batarseh et al. |
| 6,628,535 B1 * | 9/2003 | Wu .......................... G05F 1/56 363/146 |
| 6,631,263 B1 | 10/2003 | Corkery |
| 6,642,696 B2 | 11/2003 | Tateishi |
| 6,643,158 B2 | 11/2003 | McDonald et al. |
| 6,650,560 B2 | 11/2003 | MacDonald et al. |
| 6,667,599 B2 | 12/2003 | Stone et al. |
| 6,670,797 B2 | 12/2003 | Johanning |
| 6,678,178 B2 | 1/2004 | Lipcsei |
| 6,693,413 B1 | 2/2004 | Lanni |
| 6,696,821 B2 | 2/2004 | Haraguchi et al. |
| 6,700,780 B2 | 3/2004 | Hedberg et al. |
| 6,700,808 B2 | 3/2004 | MacDonald et al. |
| 6,703,815 B2 | 3/2004 | Biagi |
| 6,707,284 B2 | 3/2004 | Lanni |
| 6,717,827 B2 | 4/2004 | Ota |
| 6,729,383 B1 | 5/2004 | Cannell et al. |
| 6,731,844 B2 | 5/2004 | Conrad et al. |
| 6,746,279 B1 | 6/2004 | Lopez |
| 6,751,104 B2 | 6/2004 | Qiao et al. |
| 6,751,109 B2 | 6/2004 | Doss et al. |
| 6,765,368 B2 | 7/2004 | Stone et al. |
| 6,768,223 B2 | 7/2004 | Powell et al. |
| 6,780,034 B2 | 8/2004 | Shiroshita et al. |
| 6,795,302 B2 | 9/2004 | Kluth et al. |
| 6,809,943 B2 | 10/2004 | Lanni |
| 6,820,686 B2 | 11/2004 | Yang et al. |
| 6,831,848 B2 | 12/2004 | Lanni |
| 6,836,101 B2 | 12/2004 | Lanni |
| 6,850,423 B2 | 2/2005 | Lanni |
| 6,855,284 B2 | 2/2005 | Lanni et al. |
| 6,877,551 B2 | 4/2005 | Stoller |
| 6,903,950 B2 | 6/2005 | Afzal et al. |
| 6,922,347 B2 | 7/2005 | Lanni |
| 6,929,516 B2 | 8/2005 | Brochu et al. |
| 6,934,561 B2 | 8/2005 | Burrus, IV |
| 6,936,936 B2 | 8/2005 | Fischer et al. |
| 6,937,490 B2 | 8/2005 | MacDonald et al. |
| 6,939,150 B1 | 9/2005 | Lanni |
| 6,950,000 B1 | 9/2005 | Lanni et al. |
| 6,952,347 B2 | 10/2005 | Baeumel et al. |
| 6,965,504 B2 | 11/2005 | Liu et al. |
| 6,974,342 B2 | 12/2005 | Thomas |
| 6,975,511 B1 | 12/2005 | Lebo et al. |
| 6,976,885 B2 | 12/2005 | Lord |
| 6,990,017 B1 | 1/2006 | Parkinson et al. |
| 6,999,505 B2 | 2/2006 | Yokoo et al. |
| RE39,036 E | 3/2006 | Castleman |
| 7,027,300 B2 | 4/2006 | Lord |
| 7,028,202 B2 | 4/2006 | Long et al. |
| 7,035,126 B1 | 4/2006 | Lanni |
| 7,039,821 B1 | 5/2006 | Potega |
| 7,053,742 B2 | 5/2006 | Lanni et al. |
| 7,056,149 B2 | 6/2006 | Lanni |
| 7,058,484 B1 | 6/2006 | Potega |
| 7,065,173 B2 | 6/2006 | Lacey et al. |
| 7,071,533 B1 | 7/2006 | Kimber et al. |
| 7,072,200 B2 | 7/2006 | Lanni |
| 7,106,623 B2 | 9/2006 | Hung et al. |
| 7,127,623 B2 | 10/2006 | Potega |
| 7,142,423 B2 | 11/2006 | Lanni |
| 7,144,222 B2 | 12/2006 | Lanni et al. |
| 7,145,312 B2 | 12/2006 | Lanni |
| 7,145,787 B2 | 12/2006 | Lanni |
| 7,148,659 B2 | 12/2006 | Lanni |
| 7,149,097 B1 | 12/2006 | Shteynberg et al. |
| 7,153,169 B2 | 12/2006 | Lord |
| 7,154,774 B2 | 12/2006 | Bedeschi et al. |
| 7,166,937 B2 * | 1/2007 | Wilson .................... H02M 3/00 307/151 |
| 7,190,607 B2 | 3/2007 | Cho et al. |
| 7,193,398 B2 | 3/2007 | Lanni |
| 7,193,873 B2 | 3/2007 | Lanni |
| 7,224,086 B2 | 5/2007 | Germagian et al. |
| 7,243,246 B2 | 7/2007 | Allen et al. |
| 7,245,515 B2 | 7/2007 | Chiang |
| 7,254,048 B2 | 8/2007 | Lanni |
| 7,258,572 B2 | 8/2007 | Milan |
| 7,265,650 B2 | 9/2007 | Jang et al. |
| 7,265,973 B2 | 9/2007 | Lanni |
| 7,266,003 B2 | 9/2007 | Lanni |
| 7,274,616 B2 | 9/2007 | Furuta et al. |
| 7,279,868 B2 | 10/2007 | Lanni |
| 7,280,390 B2 | 10/2007 | Kostylev et al. |
| 7,296,164 B2 | 11/2007 | Breen et al. |
| 7,307,268 B2 | 12/2007 | Scheuerlein |
| 7,318,744 B2 | 1/2008 | Kuo |
| 7,355,851 B2 | 4/2008 | Lanni |
| 7,365,524 B2 | 4/2008 | Lanni |
| 7,365,972 B2 | 4/2008 | Chen et al. |
| 7,377,805 B2 | 5/2008 | Kim et al. |
| 7,392,099 B2 | 6/2008 | Atkinson et al. |
| 7,392,410 B2 | 6/2008 | Allen et al. |
| 7,416,086 B2 | 8/2008 | Lanni |
| 7,420,823 B2 | 9/2008 | Lanni |
| 7,434,793 B2 | 10/2008 | Kunath et al. |
| 7,450,390 B2 | 11/2008 | Lanni |
| 7,450,403 B2 | 11/2008 | Lanni |
| 7,453,171 B2 | 11/2008 | Lanni |
| 7,460,381 B2 | 12/2008 | Lanni |
| 7,489,116 B2 | 2/2009 | Lanni |
| 7,495,941 B2 | 2/2009 | Lanni |
| 7,504,800 B2 | 3/2009 | Culbert et al. |
| 7,525,216 B2 | 4/2009 | Tupman et al. |
| 7,529,110 B1 | 5/2009 | Haines |
| 7,535,756 B2 | 5/2009 | Lung |
| 7,564,706 B1 | 7/2009 | Herbert |
| D598,846 S | 8/2009 | Satoh et al. |
| 7,581,119 B2 | 8/2009 | Tupman et al. |
| 7,642,671 B2 | 1/2010 | Mahaffey |
| 7,701,739 B2 | 4/2010 | Mollo |
| 7,701,758 B2 | 4/2010 | Nakai |
| 7,823,214 B2 | 10/2010 | Rubinstein et al. |
| 7,864,607 B2 | 1/2011 | Patel et al. |
| 7,868,486 B2 | 1/2011 | Lanni |
| 7,876,607 B2 | 1/2011 | Tang |
| 7,894,239 B2 | 2/2011 | Tamai et al. |
| 7,937,603 B2 | 5/2011 | Haeberle et al. |
| 7,999,412 B2 | 8/2011 | Lanni |
| 8,031,516 B2 | 10/2011 | Tang |
| 8,080,853 B2 | 12/2011 | Tsuzuki et al. |
| 8,184,456 B1 | 5/2012 | Jain et al. |
| 8,225,111 B2 | 7/2012 | Bailey et al. |
| 8,242,536 B2 | 8/2012 | Tanabe et al. |
| 8,254,198 B2 | 8/2012 | Borot et al. |
| 8,259,515 B2 | 9/2012 | Bedeschi et al. |
| 8,261,100 B2 | 9/2012 | Paniagua et al. |
| 8,296,587 B2 | 10/2012 | Paniagua et al. |
| 8,330,303 B2 | 12/2012 | Lanni |
| 8,492,933 B2 | 7/2013 | Lanni |
| 8,767,482 B2 | 7/2014 | Hirst et al. |
| 8,907,430 B2 | 12/2014 | Usujima et al. |
| 9,390,768 B2 | 7/2016 | Hirst et al. |
| 2001/0030879 A1 | 10/2001 | Greenfeld et al. |
| 2002/0040722 A1 | 4/2002 | Okajima |
| 2002/0058162 A1 | 5/2002 | Shibata et al. |
| 2002/0064186 A1 | 5/2002 | Aoyagi et al. |
| 2002/0067630 A1 | 6/2002 | Tokunaga et al. |
| 2002/0070702 A1 | 6/2002 | Ragnarsson |
| 2002/0071290 A1 | 6/2002 | Youn et al. |
| 2002/0138846 A1 | 9/2002 | Mizutani et al. |
| 2002/0171980 A1 | 11/2002 | Tsukihashi |
| 2003/0085621 A1 | 5/2003 | Potega |
| 2003/0107098 A1 | 6/2003 | Ota et al. |
| 2003/0112645 A1 | 6/2003 | Schlecht |
| 2003/0174521 A1 | 9/2003 | Batarseh et al. |
| 2003/0207603 A1 | 11/2003 | Potega |
| 2003/0222503 A1 | 12/2003 | Lam et al. |
| 2004/0007708 A1 | 1/2004 | Ichinose et al. |

(56) References Cited

U.S. PATENT DOCUMENTS

| | | |
|---|---|---|
| 2004/0075419 A1 | 4/2004 | Massey et al. |
| 2004/0108843 A1 | 6/2004 | Lanni |
| 2004/0177947 A1 | 9/2004 | Krassowski et al. |
| 2004/0201973 A1 | 10/2004 | Chiang et al. |
| 2004/0227635 A1 | 11/2004 | Sabatino |
| 2005/0021510 A1 | 1/2005 | Uchida et al. |
| 2005/0073862 A1 | 4/2005 | Mednik et al. |
| 2005/0083615 A1 | 4/2005 | Rose |
| 2005/0117371 A1 | 6/2005 | Imamura |
| 2005/0127758 A1* | 6/2005 | Atkinson ............... H02J 9/005 307/80 |
| 2005/0151506 A1 | 7/2005 | Kennedy et al. |
| 2005/0162020 A1 | 7/2005 | Lanni |
| 2005/0173989 A1 | 8/2005 | Wu |
| 2005/0197018 A1 | 9/2005 | Lord |
| 2005/0198682 A1 | 9/2005 | Wright |
| 2005/0213355 A1 | 9/2005 | Koike |
| 2005/0240705 A1 | 10/2005 | Novotney et al. |
| 2005/0281073 A1 | 12/2005 | Cho et al. |
| 2006/0002173 A1 | 1/2006 | Parkinson et al. |
| 2006/0005737 A1 | 1/2006 | Kumar |
| 2006/0007715 A1 | 1/2006 | MacDonald et al. |
| 2006/0015757 A1 | 1/2006 | Tupman et al. |
| 2006/0082934 A1 | 4/2006 | Price et al. |
| 2006/0091989 A1 | 5/2006 | Vinciarelli et al. |
| 2006/0098358 A1 | 5/2006 | Wambsganss et al. |
| 2006/0152084 A1 | 7/2006 | Tupman et al. |
| 2006/0154530 A1 | 7/2006 | Novotney et al. |
| 2006/0157679 A1 | 7/2006 | Scheuerlein |
| 2006/0164061 A1 | 7/2006 | Formenti et al. |
| 2006/0174126 A1 | 8/2006 | Crandall et al. |
| 2006/0220465 A1 | 10/2006 | Kingsmore et al. |
| 2006/0278900 A1 | 12/2006 | Chang et al. |
| 2007/0072474 A1 | 3/2007 | Beasley et al. |
| 2007/0073420 A1 | 3/2007 | Lanni |
| 2007/0103836 A1 | 5/2007 | Oh |
| 2007/0230227 A1 | 10/2007 | Palmer |
| 2007/0263703 A1 | 11/2007 | Mahaffey |
| 2008/0111521 A1 | 5/2008 | So et al. |
| 2008/0146216 A1 | 6/2008 | Newman et al. |
| 2008/0256394 A1 | 10/2008 | Rashevsky et al. |
| 2009/0021189 A1 | 1/2009 | Dubose et al. |
| 2009/0147558 A1 | 6/2009 | Tamai et al. |
| 2009/0167083 A1 | 7/2009 | Kuo et al. |
| 2009/0285016 A1 | 11/2009 | Bedeschi et al. |
| 2010/0090531 A1 | 4/2010 | Mahaffey |
| 2010/0149856 A1 | 6/2010 | Tang |
| 2010/0149857 A1 | 6/2010 | Tang |
| 2010/0156506 A1 | 6/2010 | Tsuzuki et al. |
| 2010/0187567 A1 | 7/2010 | Tanabe et al. |
| 2010/0246237 A1 | 9/2010 | Borot et al. |
| 2010/0308420 A1 | 12/2010 | Usujima et al. |
| 2011/0095605 A1 | 4/2011 | Lanni |
| 2011/0149613 A1 | 6/2011 | Lanni |
| 2013/0044539 A1 | 2/2013 | Hirst et al. |

FOREIGN PATENT DOCUMENTS

| | | |
|---|---|---|
| CN | 101764139 A | 6/2010 |
| CN | 103748630 A | 4/2014 |
| DE | 1234315 B | 2/1967 |
| DE | 2027405 A1 | 12/1971 |
| DE | 2013817 A1 | 1/1972 |
| DE | 112012003422 T5 | 5/2014 |
| EP | 0469533 A2 | 2/1992 |
| EP | 1001513 A2 | 5/2000 |
| EP | 1107437 A2 | 6/2001 |
| EP | 1122873 A2 | 8/2001 |
| EP | 1367657 A2 | 12/2003 |
| EP | 1487081 A2 | 12/2004 |
| EP | 1942562 A2 | 7/2008 |
| GB | 2215531 A | 9/1989 |
| GB | 2291278 A | 1/1996 |
| GB | 2303256 A | 2/1997 |
| GB | 2322486 A | 8/1998 |
| GB | 2326540 A | 12/1998 |
| JP | 57-162310 A | 10/1982 |
| JP | 03-212913 A | 9/1991 |
| JP | 10-106256 A | 4/1998 |
| JP | 2000-349336 A | 12/2000 |
| JP | 2002-029713 A | 1/2002 |
| JP | 2002-187800 A | 7/2002 |
| JP | 2002-270525 A | 9/2002 |
| JP | 2003-046128 A | 2/2003 |
| JP | 2004-362761 A | 12/2004 |
| JP | 2006-004614 A | 1/2006 |
| JP | 2006-190424 A | 7/2006 |
| JP | 2008-016144 A | 1/2008 |
| JP | 2008-527613 A | 7/2008 |
| JP | 2008-306157 A | 12/2008 |
| JP | 2009-141225 A | 6/2009 |
| JP | 2014-529838 A | 11/2014 |
| KR | 10-2014-0047146 A | 4/2014 |
| TW | 538443 B | 6/2003 |
| WO | 98/19223 A1 | 5/1998 |
| WO | 99/12244 A1 | 3/1999 |
| WO | 01/73900 A1 | 10/2001 |
| WO | 03/38980 A1 | 5/2003 |
| WO | 2005/015721 A1 | 2/2005 |
| WO | 2006/116298 A1 | 11/2006 |
| WO | 2008/034064 A2 | 3/2008 |
| WO | 2009/158673 A1 | 12/2009 |
| WO | 2013/026044 A1 | 2/2013 |

OTHER PUBLICATIONS

Radio Shack 1994 Catalog, cover page and p. 142, 1994.

Radio Shack 1995 Catalog, cover page and pp. 150-151, 1995.

Redl, Richard, et al.: A New Family of Single-Stage Isolated Power-Factor Correctors with Fast Regulation of the Output Voltage, Power Electronics Specialist Conference (PESC) Taipei Taiwan Jun. 20, 1994 pp. 1137-1144.

Revolution Education Ltd., "AXE027 Picaxe USB Cable", pp. 1-4, Revolution Education Ltd., Jun. 6, 2006.

Rodriguez et al., "A Novel Integrated SMPS with Battery Backup and Power Factor Correction," Departamento de Electronica, Cuernavaca, Mor. Mexico, Interior Palmira s/n Apdo. 5-164, CP 62050.

Semiconductor Components Industries, LLC "NCP1380 Quasi-Resonant Current-Mode Controller for High-Power Universal Off-Line Supplies," Dec. 2009, pp. 1-26.

Semiconductor Components Industries, LLC "NCP5106 High Voltage, High and Low Side Driver," Mar. 2010, pp. 1-18.

Smart Battery Data Specification, Revision 1.1, Dec. 11, 1998, http://www.sbs-forum.org/specs/errata_sbdat110a.pdf, pp. 1-49.

Taiwanese Office Action dated Nov. 22, 2013 with a partial Japanese translation and an English-language translation of same.

Tupman et al., "Method and System for Discovering a Power Source on a Peripheral Bus", U.S. Appl. No. 11/031,288, filed Jan. 7, 2005.

Tupman et al., "Portable Power Source to Provide Power to an Electronic Device via an Interface", U.S. Appl. No. 11/031,547, filed Jan. 7, 2005.

Valence Technology, Inc., "N-Charge power Center", pp. 1-2, Valence Technology, Inc., Feb. 2004.

Xtend Micro Products, Inc., 50W DC Adapter Specification, Revision 1.01, (5 pages).

Xtend Micro Products, Inc., Assembly Drawing for Xtend Cable, Output, DC Adapter, Rev. C, (3 pages).

Yang, Ying-Ge, "Preparation and Structural Properties for GaN Films Grown on Si (1 1 1) by Annealing", Applied Surface Science, vol. 193, 2002, pp. 254-260.

ZDNet, ZDNet AnchorDesk, "Hey road warriors: This gadget will charge you up", 2-pgs, Web link: http://www.zdnet.com/anchordesk/stories/story/0,10738,2898375,00.html (1 of 2) [Dec. 3, 2002 10:48:28 AM].

ZDNet, ZDNet AnchorDesk, E-mail newsletter, (Reprint of 11/22 article), "Hey Road Warriors: This Gadget will Charge You Up", 2-pgs, Web link: http://www.zdnet.com/anchordesk/stories/story/0,10738,2898375,00.html.

(56) References Cited

OTHER PUBLICATIONS

ZDNet, ZDNet Tech Update Today, E-mail newsletter, "Got Juice? It's a must-have for road Warriors", 2-pgs, Web link: http://techupdate.zdnet.com/techupdate/stories/main/0, 14179,2898233,00.html.
European Search Report dated Nov. 24, 2008 for EP Patent Application No. 07254497.6, 13 pages.
European Search Report dated Sep. 28, 2006 for EP Patent Application No. EP05250133.5, 3 pages.
European Search Report for Corresponding European Application (Patent Application No. 0 32 53 613.8), dated Apr. 13, 2005.
European Search Report for Corresponding European Patent Application (Patent Application No. 0 42 25 2678), dated Aug. 30, 2004.
European Search Report for European Patent Application EP 03 25 7677, dated Jun. 16, 2005, European Patent Office.
EuropeanSearchReportforCorrespondingPatentApplicationNo. 04253655.7 dated Jun. 30, 2006.
Extend Micro Products, Inc., Invoice for 50 Watt DC Adapter to Ingram Micro, (1 page).
Extended European Search Report dated Jul. 13, 2012.
Fairchild Semiconductor, Application Note AN-6300, "FAN6300/AH—Highly Integrated Quasi-Resonant PWM Controller", Jun. 16, 2009, 13 pages.
Future Technology Devices International Ltd., "TTL-232R-3V3 USB to TTL Serial Converter Cable", (3.3V IO) Datasheet Version 0.90, pp. 1-8, Future Technology Devices International Ltd., 2006.
H. Noma, and T. Miyasato, "Design for Locomotion Interface in a Large Scale Virtual Environment ATLAS: ATR Locomotion Interface for Active Self Motion," Proc. ASME Dynamic Systems and Control Division, vol. 74, pp. 111-118 1998.
IEEE Systems Readiness Technology Conference, Test Technology for the New Millennium, IEEE Catalog, No. 99CH36323, Aug. 30-Sep. 2, 1999.
Instruction Manual for LNS-W Power Supply Series, Lambda Electronics Inc.
International Search Report and Written Opinion in corresponding PCT Application No. PCT/US2012/051489 dated Dec. 26, 2012.
International Search Report and Written Opinion dated Mar. 16, 2010 for International Patent Aoolication No. PCT/US2009/054767 filed Aug. 24, 2009.
Japanese Office Action dated Jul. 20, 2010 (with partial English translation).
Jobs et al., "Media Management for Groups of Media Items", U.S. Appl. No. 60/642,334, filed Jan. 7, 2005.
Jobs et al., "Portable Media Device and Improved Playlist Processing on Media Devices", U.S. Appl. No. 60/642,276, tiled Jan. 7, 2005.
Juice .sup.70 .TM. The Power of One, iGo mobility products,5-pgs.
Juice—The power of one, iGo mobility products, "Juice.sup.70 Turning Power into Productivity"; 1-pg, Web link: http://www.igo.com/mapfiles/juice.asp [Nov. 8, 2002 9:50:19 AM].
K. Aminian, P. Robert, E. Jequier, and Y. Schutz, "Estimation of Speed and Incline of Walking Using Neutral Network," IEEE. Trans. on Instrumentation and Measurement, vol. 44, pp. 743-746, 1995.
Kobayashi, et al,"Single-crystal .alpha.-GaN grown on a .alpha.-Ga2O3 template layer", Applied Physics Letters, vol. 73, Sep. 14, 1998, pp. 1553-1555.
Linear Technology, Micropower Synchronous Buck-Boost DC/DC Converter, pp. 1-16.
Luo, Shiguo, et, al., Florida Power Electronics Center, "Flyboost Power Factor Correction Cell and Its Application in Single-Stage AC-DC Converters", pp. 1375-1380.
MacCentral, Macworld's News Service, "iGo Juice charges PowerBook, PDA, cell phone", 2-pgs.
Macworld, "On the Road", vol. 12, No. 7, Jul. 1995, pp. 141-142, 5/9/1 (Item 1 from tile: 15) DIALOG(R) File 15:ABI/INFORM(R).
Merriam-Webster Online Dictionary; http://www.merriam-webster.com/dictionary/across.
Minwa Products, "MW182", Minwa Products Catalog, 1993.
Mobility Electronics, "Mobility Electronics Unveils "JUICE"—First Universal, Combination AC/DC and DC/DC Power Adapter for Notebooks and Mobile Devices", 3-pgs, Web link: http://www/mobilityelectronics.com/releases/2002/2002.sub.--26.sub.-06.s-ub.-01.asp.
Mobility Electronics: Welcome, Mobility Electronics—Improving Your Mobile Experience, 1-pg, Web link: http://ww.mobilityelectronics.com/ [Nov. 8, 2002, 9:49:27 AM].
Motorola, "Motomanual—Motorola Razr V3", pp. 1-254, English and Spanish version, Motorola, Inc., 2006.
Motorola: Analog 1C Device Data, DC-to-DC Converter Circuits—vol. 1, DL 128/D—Revision 6, 1996, XP002330527.
National Semiconductor Corporation, "Datasheet for LM2601 Adapter Interface Circuit", dated Apr. 2001, 6 pages.
Nesco Battery Systems, SmartAdapter+ Model SA6-V21/30, 6 to 21 Volt DC Universal Adjustable DC Power Adapter Owner's Manual, 1999 (17 pages).
New Tech Industries—Universal AC-DC Converters, http://www.newtechindustries.com/newtech/access/pageA19.htm.
Nokia Corporation, Nokia 2-mm DC Charging Interface Specification (Version 1.2), pp. 1-22, Nokia Corporation, Aug. 22, 2006.
Novotney et al., "Connector Interface System for a Multi-Communication Device", U.S. Appl. No. 10/833,689, filed Apr. 27, 2004.
Novotney et al., "Connector System", U.S. Appl. No. 11/031,301, filed Jan. 7, 2005.
Office Action dated Aug. 4, 2015 issued in corresponding Japanese Application No. 2014-526265, along with its English translation.
Paniagua et al., "Power Supply Capable of Receiving Digital Communications from Electronic Devices", U.S. Appl. No. 11/513,687, filed Aug. 30, 2006.
PC Magazine, Highlights from PC Expo 2002, 1-pg, Web link: http://www.pcmag.com/article2/0,4149,286129,00.asp.
PC World Technology Advice You Can Trust, 2-pgs, Web link: http://www.pcworld.com/features/article/0,aid,105851,p.12,00.asp.
PC World.Com, Technology Advice You Can Trust, Mobile Gear Gets a Charge on the Run, More Power to you: Seidio, IGo unveils kits that recharge notebooks, PDAs, cell phones from various sources, 2-pgs, Web link: http://www.pcworld.com/news/article/0,aid,102345,00.asp.
Peripheral Powering System (PPS), iGo mobility products, Q&A, 2-pgs.
Power Stream Technology, "High Quality Automobile to Laptop DC/DC Converter" Specification sheet copyright 2000, 2002, 2003, 2004—4 pages.
Press Release entitled "TeleAdapt's OEM division shows eye for innovation with its new UK folding plug," Mar. 22, 2001, retrieved from http://www.teleadaptusa.com/nma/press_ukfoldingplug.htm.
Press Release of Empire Engineering, Design and Management, Jul. 5, 1995—San Luis Obispo, CA USA, pp. 1-2.
Qian, Jinrong, "Advanced Single-Stage Power Factor Correction Techniques," Virginia Polytechnic Institute and State University Ph.D. Dissertation, Sep. 25, 1997, pp. i-xi, 1-174.
Qian, Jinrong, et al.: "Single-Stage Single-Switch Power Factor Correction (S4-PFC) AC/DC Converters with DC Bus Voltage Feedback for Universal Line Applications", 13th Annual Applied Power Electronics Conference & Exposition, Anaheim, CA, Feb. 15, 1998, pp. 223-229.
R. W. Soutas-Little, J.C. Otten, and A.J. Hull, "Use of Computer Aided Design and Analysis in Gait and Athletic Footwear Evaluation," ASME AMO vol. 84, pp. 349-352, 1987.
"Cellular Phones & Accessories" Sony Cellular Phone Accessories from http://216.239.33.104/search?=cache:Rsig. dated May 8, 2003.
"iGo-Buy batteries and accessories for your cellular, notebook and handheld devices", Web link: http://www.igo.com/ProductDetail.asp?catalog%5F . . . e=iGoCAT&product%5Fid=21541&variant%5Fid=134121.
"Mobility Electronics Announces the Production and Availability of 'Juice'—The First Combination AC.DC and DC.DC Power Adapter for Notebooks and Mobile Devices," 3-pgs, Web link: http://biz.yahoo.com/prnews/030113/lam020.sub.—1.html (1 of 3) [Jan. 13, 2003 9:13:47 AM].

(56) References Cited

OTHER PUBLICATIONS

"New PowerXtenders Adapter Lets Portable Comuter Users Plug Into Computer Power on Airplanes and Cars," [on-line], Apr. 30, 1997, [retrieved Feb. 13, 2001], pp. 1-3, retrieved from Internet: http://www.roadwarrior.com/xtend/news/pressreleases/pr-970420.html.
"Portable Computers Fly High in the Sky with Airline Seat Power," [on-line], Nov. 18, 1996 [retrieved Feb. 13, 2001], pp. 1-2, retrieved from Internet: http://www.roadwarrior.com/xtend/news/pressreleases/pr-961118.html.
"Super Selection of Power Adapters", Radio Shack Catalog, p. 128, Dec. 1992.
ABC Cables, Universal Power Supply with Detachable Plugs, http://www.abccables.com/900-102.htm.
*ACCO Brands USA LLC* vs. *Comarco Wireless Technologies, Inc.*, Case No. C11-4378 RS, U. S. District Court for the Northern District of California, Plaintiff and Counterdefendant ACCO's Invalidity Contentions, pp. 1-3 and Exhibit E, pp. 1-6, Jun. 27, 2012.
AllNetDevices, "Company Unveils Mobile Power and Palm Presentation Products", 2-pgs, Web link: http://www/allnetdevices.com/Wireless/news/2002/07/02/company.sub.--unvei- ls.html.
Alpha & Omeda Semiconductor; EZBuck.TM. 3A Simple Buck Regulator, No. A0Z1212, (Dated: Rev. 1.5 May 2009; 18 pgs.).
American Power Conversion, "APC Universal Notebook Battery (UPB60) User's Manual", pp. 1-2, American Power Conversion, 2005.
Borgonovo, Deivis, et al: "A Self-Controlled Power Factor Correction Single-Phase Boost Pre-Regulator", Power Electronics Specialists Conference, 2005, Piscataway, NJ, Jan. 1, 2005 pp. 2351-2357.
Case No. C11-4378-Rs, ACCO Brands USA LLC's Reply in Support of Motion to Strike the Declaration of Thomas W. Lanni, Pacer Document No. 41, Nov. 2, 2012, 17 pages.
Case No. C11-4378-RS, Claim Construction Order, Pacer Document No. 49, Mar. 6, 2013, 23 pages.
Case No. C11-4378-RS, Comarco Wireless Technologies, Inc.'s Memorandum of Points and Authorities in Opposition to Plaintiff's Motion to Strike the Declaration of Thomas W. Lanni, Pacer Document No. 40, Oct. 26, 2012, 16 pages.
Case No. C11-4378-RS, Comarco Wireless Technologies, Inc.'s Patent L.R. 4-5(a) Opening Claim Construction Brief, Pacer Document No. 36, Sep. 21, 2012, 33 pages.
Case No. C11-4378-RS, Comarco Wireless Technologies, Inc.'s Patent L.R. 4-5(a) Opening Claim Construction Brief, Pacer No. Documents 36, 36-1 and 36-2, Sep. 21, 2012, 44 pages.
Case No. C11-4378-RS, Comarco Wireless Technologies, Inc.'s Patent L.R. 4-5(c) Claim Construction Reply Brief, Pacer Document No. 42, Nov. 2, 2012, 18 pages.
Case No. C11-4378-RS, Patent L.R. 4-3 Joint Claim Construction and Prehearing Statement, Pacer Document No. 33, Aug. 31, 2012, 26 pages.
Case No. C11-4378-RS, Plaintiff ACCO Brands USA LLC's Opening Markman Brief, Pacer Document No. 38, Oct. 12, 2012, 31 pages.
Chinese Office Action dated May 8, 2009 with an English-language translation.
Comarco Wireless Technologies Power Products AC Adapter/Charger Program & Specification (5 pages, 5.sup.th page Aug. 16, 1994).
Comarco Wireless Technologies, Inc. Specification Control Drawing No. 1245-0021-T, "EPROM DS2502, TO-92", Jun. 21, 2005, 1 page.
Comarco Wireless Technologies, Inc. Specification Control Drawing No. 1910-0219, "Tip N19", May 14, 2004, 5 pages.
Comarco Wireless Technologies, Inc. Specification Control Drawing No. 1910-0224, "Tip N24", Oct. 23, 2004, 5 pages.
Combination AC and auto/air notebook power adapter, JUICE .sup.70.TM. The Power of One, iGo mobility products, Q&A, 2-pgs.
Compaq Computer Corporation et al., "Univeral Serial Bus Specification (Revision 2.0)", pp. 1-650, Compaq Computer Corporation et al., Apr. 27, 2000.
Confidential Technical/Cost Proposal re: AC Power Adapter Prepared for IBM Corporation (19 pages, 6.sup.th page dated Dec. 13, 1994).
Crandall et al., "Small Memory Footprint Fast Elliptic Encryption", U.S. Appl. No. 11/051,441, filed Feb. 3, 2005.
D.A. Farris, G.C. Urquizo, D.K. Beattie, T.O. Woods, and D.G. Berghaus, "A Simplified Accelerometer System for Analysis of Human Gait." Experimental Techniques, vol. 17, pp. 33-36, 1993.
Dallas Semiconductor Group, "DS2434 Battery Identification Chip", pp. 1-17, Dallas Semiconductor Group, 1995.
Data Sheet for Benchmarq Model bq2002C, Fast-Charge IC, Sep. 1997, 8 pages.
Data Sheet for Benchmarq Model bq2954, Lithium Ion Fast-Charge IC, Nov. 1997, 14 pages.
Declaration of David Dickey in Opposition to Comarco's Motion for Preliminary Injunction, dated Jun. 2, 2003, 8-pgs. w/Exhibits 1-13 attached.
Declaration of David Dickey in Support of Mobility Electronics, Ines Motion for Summary Judgement dated Jun. 2, 2003, 8-pgs. w/Exhibits 1-13 attached.
Declaration of Ejaz Afzal in Opposition to Comarco's Motion for Preliminary Injunction, dated Apr. 30, 2003, 9 pgs. w/Exhibits 1-2 attached.
Declaration of Ejaz Afzal in Support of Mobility Electronics, Inc. 's Motion for Summary Judgement, dated May 6, 2003, 10-pgs. w/Exhibits1-2 attached.
Declaration of Thomas W. Lanni Regarding Comarco N19 and N24 Tips, May 14, 2013, 2 pages.
Delta Air Lines, Letter to Mr. Mark Rapparport, President, Xtend Micro Products, Inc., (1 page).
Description of the "Smart Adapter System", Nesco Battery Systems, pp. 1-2, 1995 (No Month).
Electus Distribution, "Electus Distribution Reference Data Sheet: Power Adaptors or 'Plug Packs'", pp. 1-4, Electus Distribution, 2001.
Embedded Systems, How to Talk Smart, 1997, http://www.embedded.com/97.feat9611.htm.
Empire Engineering Confidential Disclosure Statement re: Universal Programmable DC Power Adapter dated Jan. 17, 1995) (3 pages).
European Patent Office "Extended European Search Report" Patent Application No. 10251843.8 of Comarco Wireless Technologies, Inc., dated Mar. 22, 2012, 11 pages.
European Patent Office, "European Extended Search Report and Written Opinion" dated Mar. 18, 2011, Application No. 10252171.3, 8 pages.
European Patent Office, "Examination Report/Communication Pursuant to Article 94(3) EPC" re: Patent Application Serial No. 02 250 133.5, dated Jun. 14, 2012, 11 pages.
European Patent Office, "Extended European Search Report" re: Patent Application No. 10250631.8 of Comarco Wireless Technologies, Inc.; dated Mar. 28, 2012; 13 pages.
European Search Report dated Feb. 6, 2009 for EP Patent Application No. 07254497.6, 13 pages.
European Search Report dated Jan. 8, 2010 for Application No. 08253310.0, 9 pages.
European Search Report dated Nov. 16, 2009.

\* cited by examiner

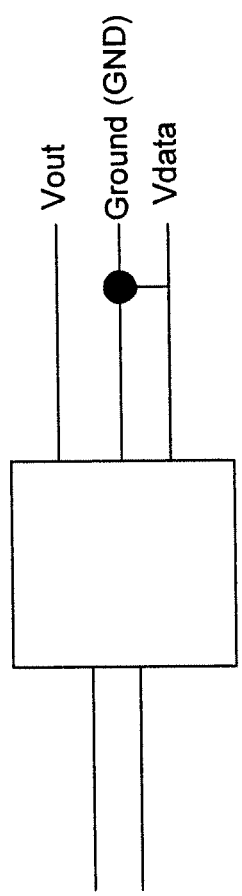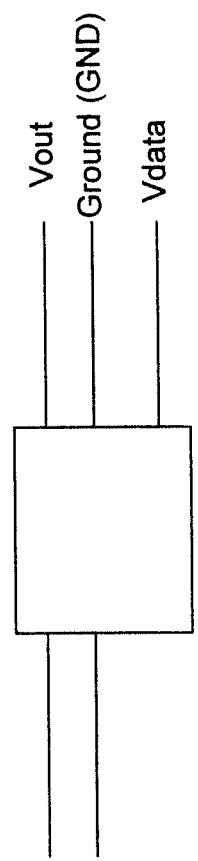
Fig. 2A
Fig. 2B

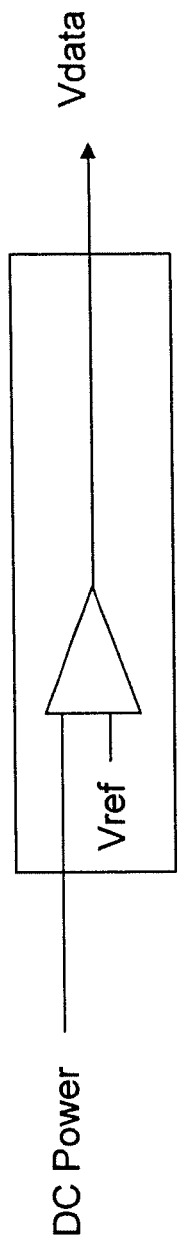
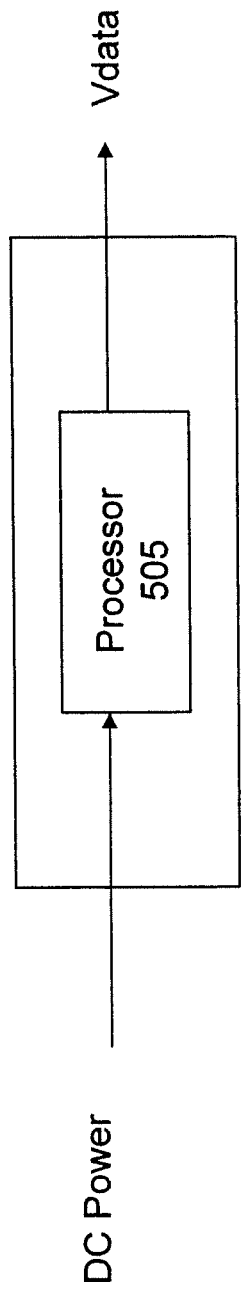

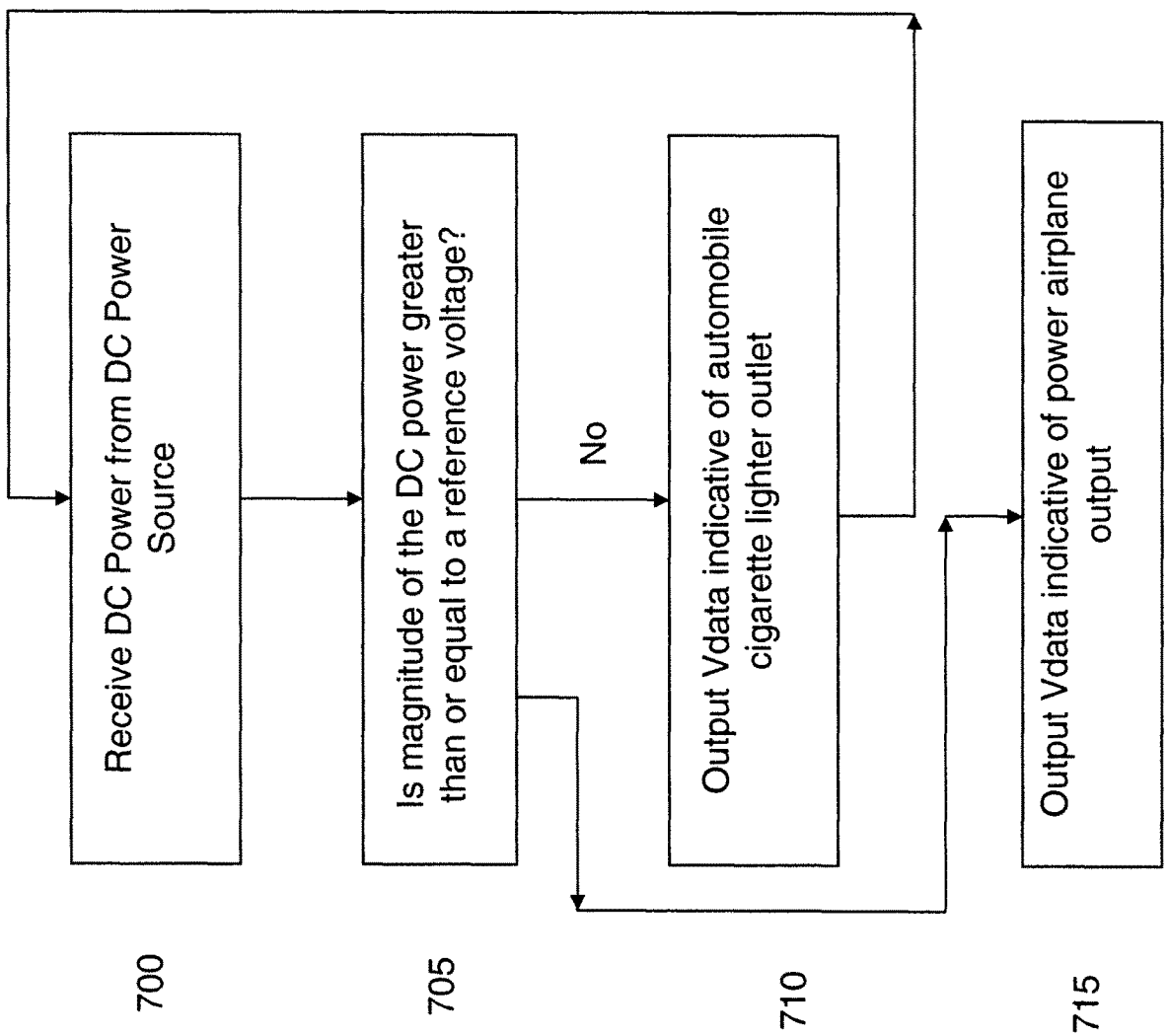

POWER SUPPLY SYSTEMS

CROSS REFERENCE TO RELATED APPLICATIONS

This application is a continuation of, and claims the benefit of, U.S. patent application Ser. No. 16/991,295 filed on Aug. 12, 2020, which is a continuation of U.S. patent application Ser. No. 16/601,447 filed on Oct. 14, 2019, which is a continuation of U.S. patent application Ser. No. 15/462,083 filed on Mar. 17, 2017, which is a continuation of U.S. patent application Ser. No. 14/736,885 filed on Jun. 11, 2015 (now U.S. Pat. No. 9,601,922), which is a division of U.S. patent application Ser. No. 13/461,149 filed on May 1, 2012 (now U.S. Pat. No. 9,153,960), which is a continuation-in-part of U.S. patent application Ser. No. 13/209,636 filed on Aug. 15, 2011 (now U.S. Pat. No. 8,330,303), which is a continuation of U.S. patent application Ser. No. 12/840,952 filed on Jul. 21, 2010 (now U.S. Pat. No. 7,999,412), which is a continuation-in-part of U.S. patent application Ser. No. 11/604,950 filed on Nov. 28, 2006 (now U.S. Pat. No. 7,868,486), which is a continuation-in-part of U.S. patent application Ser. No. 10/758,933 filed on Jan. 15, 2004 (now U.S. Pat. No. 7,453,171); the disclosures of which are hereby incorporated by reference in their entirety.

BACKGROUND OF THE INVENTION

Technical Field

This invention relates to tips for coupling DC power adapters to electronic devices and having the tip provide communication to power adapters and electronic devices.

Description of the Related Arts

There are power systems in the art which allow a user to hook up a DC/DC adapter to an automobile outlet, to supply regulated DC power to power an electronic device, such as a notebook computer. Automobile outlets typically provide a DC voltage in a range between 11.0 and 14.1 Volts. Some power systems also allow the user to hook up the DC/DC adapter to an airplane output such as the EMPOWER system. EMPOWER typically provides a DC voltage in a range between 14.5 and 15.5 Volts.

Accordingly, some DC/DC adapters can be used with both an automobile outlet and the EMPOWER system to provide a regulated DC power to the electronic device such as the notebook computer. Notebook computers often contain lithium ion batteries. Such batteries can be recharged when the notebook computer is hooked up to the DC/DC adapter. For example, if the user is in a car, the user can couple a DC/DC adapter to the notebook computer and to the cigarette lighter outlet to power the notebook computer. The batteries in the notebook computer will draw some of the DC power supplied to recharge the batteries of the notebook computer if they are low in power. Accordingly, the user can simultaneously use the notebook computer and recharge the batteries therein.

The user can also use the DC/DC adapter while on an airplane, by plugging the DC/DC adapter into the EMPOWER outlet. The EMPOWER outlet and the automobile outlets have different sizes and shapes. Accordingly, the user can directly plug the DC/DC adapter into the EMPOWER outlet, and can place a connector over the EMPOWER plug of the DC/DC adapter and then plug the connector into the automobile cigarette lighter outlet. When the user hooks the DC/DC adapter up to the EMPOWER outlet and then to the electronic device, the electronic device receives the regulated DC power. However, if the charging circuitry in the battery malfunctions, the battery can overheat or even catch on fire when recharging from an EMPOWER DC source. If the battery were to catch on fire while an airplane in which the EMPOWER outlet is located is flying, the fire would have the potential to cause the airplane to crash or cause substantial damage.

To address this problem, one system in the art provides a connector to connect between the DC/DC adapter and the notebook computer to inform the notebook computer not to recharge the batteries. FIG. 1 illustrates a power supply system according to the prior art. As shown, a DC power source 100 is coupled to a DC/DC adapter 105 via a cable 102. The DC/DC adapter 105 receives power from the DC power source 100 and outputs regulated DC power to an electronic device 120, via a cable 110 and a connector 115 coupled to the end of the cable 110.

The DC/DC adapter 105 can provide three output pins to the electronic device 120, as shown in FIGS. 2A and 2B of the prior art. The first pin can provide the output voltage (i.e., $V_{out}$), the second pin can provide a ground reference (i.e., GND), and the third pin can provide a data line (i.e., $V_{data}$) to instruct the notebook as to whether the batteries should be recharged or not. For example, as shown in FIG. 2A, $V_{data}$ could be tied to GND to indicate that the DC power source 100 is the EMPOWER system and therefore the battery should not be recharged. Alternatively, as shown in FIG. 2B, $V_{data}$ could also be left open (i.e., to provide a non-grounded floating voltage) when the DC power source 100 is a cigarette lighter outlet of an automobile. Accordingly, when using the DC/DC adapter 105 while in an automobile, the user would use a connector 115 having the $V_{data}$ line floating, and when using the DC/DC adapter 105 with the EMPOWER system of an airplane, the user would use a connector 115 having the $V_{data}$ line tied to GND.

However, problems arise when the user forgets to change the connector 115 for use with the automobile when the user is in an airplane. Accordingly, if the user has the wrong connector 115 attached when using with the EMPOWER system, a battery of an electronic device 120 such as a notebook computer can charge the battery even when used with the EMPOWER system, and if the charging circuitry of the battery malfunctions, overheating or even a fire can occur, resulting in damage to the notebook computer. Also, if the connector 115 is damaged or flawed, then it may not provide the correct $V_{data}$ signal to the notebook computer, allowing the notebook computer to recharge the batteries in an airplane when they shouldn't be allowed to do so.

Accordingly, current DC/DC power adapter systems are deficient because they are incapable of automatically and intelligently informing an electronic device 120 coupled thereto of the DC power source (i.e., the EMPOWER system or an automobile cigarette lighter outlet).

BRIEF DESCRIPTION OF THE DRAWINGS

FIG. 2A illustrates a first connector to coupled a power supply system to an electronic device according to the prior art;

FIG. 2B illustrates a second connector to coupled a power supply system to an electronic device according to the prior art;

FIG. 5A illustrates comparison circuitry according to an embodiment of the invention;

FIG. 5B illustrates comparison circuitry according to an additional embodiment of the invention;

FIG. 7A illustrates a method of determining and outputting $V_{data}$ according to an embodiment of the invention;

DETAILED DESCRIPTION

An embodiment of the present invention is directed to a power supply system to determine a DC power source (e.g., an automobile cigarette lighter outlet or an EMPOWER airplane outlet) coupled thereto and send a signal indicative of the power source to an electronic device coupled thereto. The electronic device may be a notebook computer or other portable consumer electronic device, for example. Based on the signal sent to the electronic device, the electronic device may control the amount of power drawn to prevent overheating. For example, when a notebook computer is hooked up and the power source is the EMPOWER system, the electronic device may disable charging of the internal batteries of the notebook computer, in order to prevent damage or overheating of the batteries due to malfunction or failure. The DC power source may be determined by voltage comparison circuitry, such as a comparator, or by a voltage comparison device including a processor.

Figure 1:
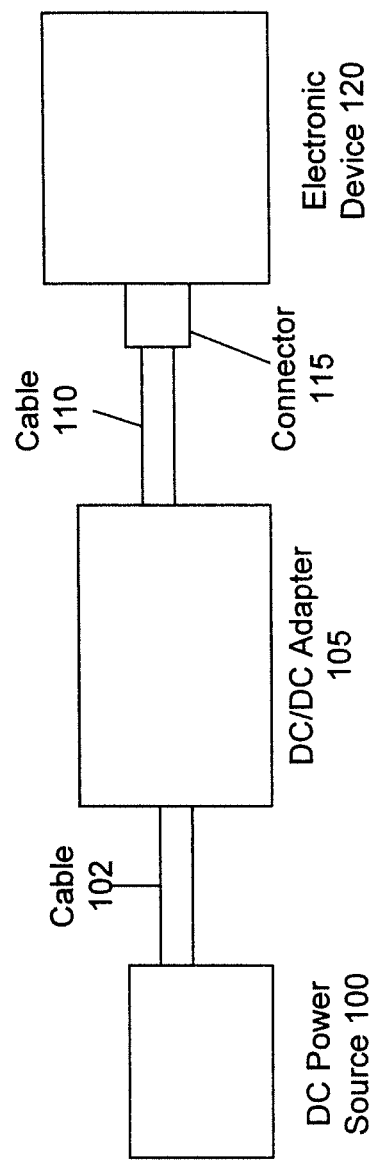
FIG. 1 illustrates a power supply system according to the prior art.
Figure 3:
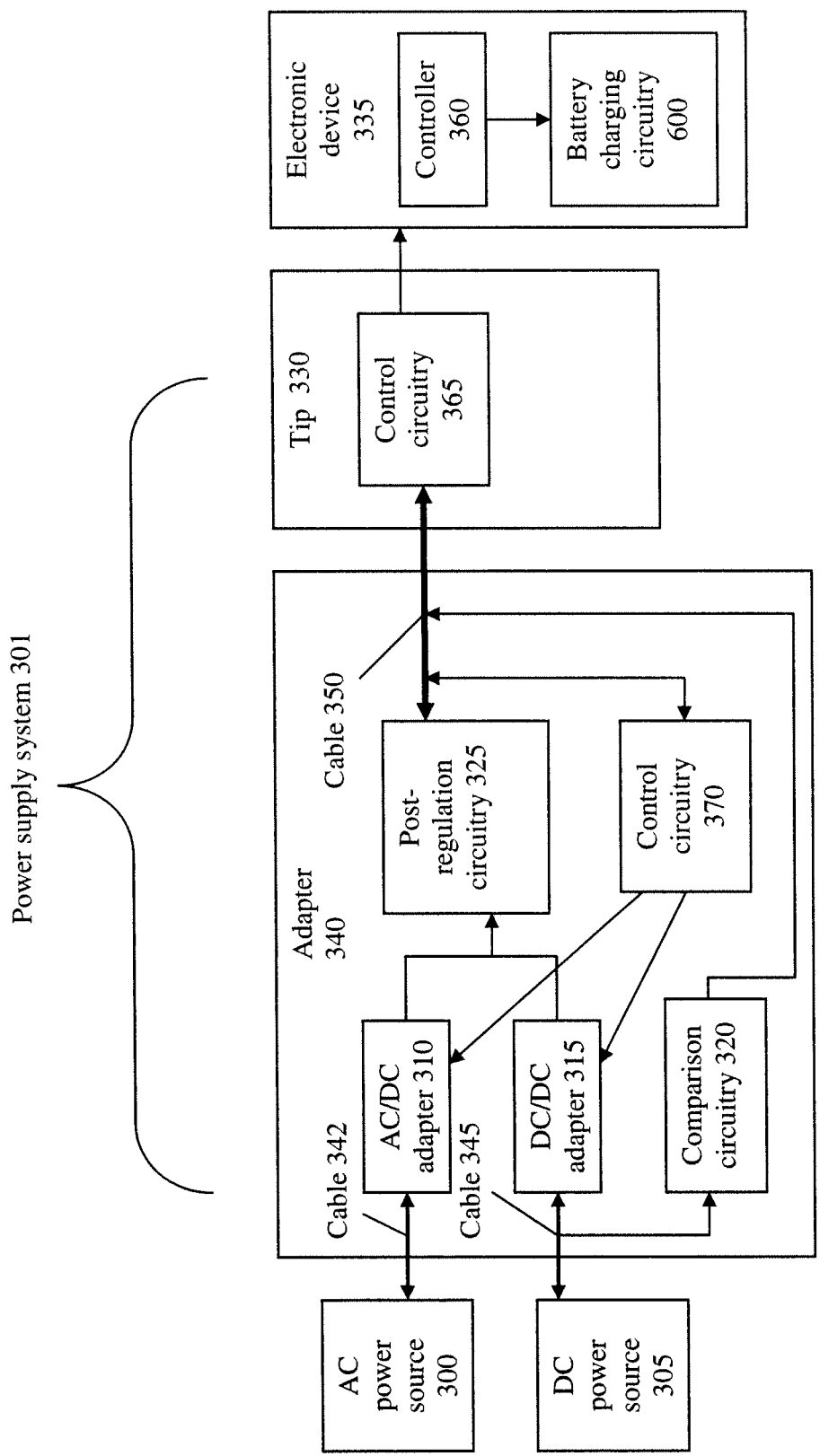
FIG. 3 illustrates a power supply system according to an embodiment of the invention.

FIG. 3 illustrates a power supply system 301 according to an embodiment of the invention. As shown, the adapter 340 may be used with an AC power source 300 or a DC power source 305. In other embodiments, only a DC power source 305 may be utilized to supply power. The AC power source 300 may be coupled to an AC/DC adapter 310 via a cable 342. The DC power source 305 may be coupled to both a DC/DC adapter 315 and comparison circuitry 320 via a cable 345. The DC power source 305 may be an automobile's cigarette lighter outlet or an airplane's EMPOWER system outlet, for example. AC/DC adapter 310 may convert AC power from the AC power source 300 into regulated DC power, which is supplied to post-regulation circuitry 325. The post-regulation circuitry 325 may provide an output voltage ($V_{out}$) and a ground reference (GND) to a tip 330 coupled to the adapter 340 via a cable 350, as further explained below with respect to FIGS. 4A and 4B. The tip 330 may be coupled to an electronic device 335 to provide the power thereto from the power supply system 301. The tip 330 may be removable from the cable 350 and may be inserted into a power input opening of the electronic device. Tips 330 may have different shapes and sizes, depending up the shape and sizes of the power input openings of the respective electronic devices 335 being powered. The tip 330 may also include control circuitry 365 to provide a signal to control circuitry 370 of the adapter 340. The signal may be sent to the control circuitry 370 via the cable 350. In one embodiment, the control circuitry 365 of the tip 330 may include digital components to provide a digital signal to the control circuitry 370 of the adapter 340. The digital signal may be utilized to set the magnitude of $V_{out}$ and limit the amount of current which may be drawn from the adapter 340. The post-regulation circuitry 325 regulates the voltage to what the tip 330 tells it to provide.

Alternatively, the tip 330 may include analog components and may provide voltage programming and current programming voltages ($V_{Vprogram}$ and $V_{Iprogram}$, respectively) to the adapter 340. $V_{Vprogram}$ may be utilized to set the magnitude of $V_{out}$. For example, there may be a linear relationship between $V_{Vprogram}$ and $V_{out}$ where $V_{out}$ is 3 times as large as $V_{Vprogram}$. Accordingly, if $V_{Vprogram}$, had a magnitude of 3.0 Volts, $V_{out}$ would have a magnitude of 9.0 Volts, and if $V_{Vprogram}$ had a magnitude of 2.0 Volts, $V_{out}$ would have a magnitude of 6.0 Volts. The analog circuitry may contain passive or active components.

Accordingly, regardless of whether the tip 330 has analog or digital control circuitry, a single adapter 340 may be used to supply power to a plurality of different electronic devices 335 having different power requirements.

An adapter device according to embodiments of the present invention may include a DC/DC adapter to receive DC power from a DC power source, and output a regulated DC voltage ($V_{out}$). A source determination circuitry may receive the DC power from the DC power source and compares a magnitude of a voltage of the DC power with a reference magnitude of a reference voltage ($V_{ref}$). When the magnitude of the voltage of the DC power is greater than the reference magnitude, a data signal ($V_{data}$) having a first value is output. When the magnitude of the voltage of the DC power is less than the reference magnitude, the $V_{data}$ signal having a second value is output. The $V_{data}$ signal is received by control circuitry of an electronic device. When the $V_{data}$ signal has the first value, the electronic device operates in a first mode where battery charging circuitry is disabled. When the $V_{data}$ signal has the second value, the battery charging circuitry is enabled.

The adapter 340 may also include comparison circuitry 320. The comparison circuitry 320 may compare a magnitude of a voltage received from the DC power source 305 with a reference voltage to determine whether the DC power source 305 is an automobile cigarette lighter outlet or an EMPOWER airplane outlet. As stated above, automobile cigarette lighter outlets typically provide a DC voltage having a magnitude within the range of 11.0 Volts and 14.1 Volts. An EMPOWER airplane outlet typically provides a DC voltage having a magnitude within the range of 14.5 and 15.5 Volts. Accordingly, the reference voltage may be set at a level between the high end of the automobile cigarette light outlet voltage (i.e., 14.1 Volts) and the low end of the EMPOWER airplane outlet voltage (i.e., 14.5 Volts). For example, the reference voltage may be set at 14.3 Volts.

Accordingly, if the magnitude of the DC power source is greater than 14.3 Volts, then the comparison voltage may determine that the received DC voltage has a greater magnitude than the reference voltage and the DC power source 305 is therefore the EMPOWER airplane outlet. However, if the magnitude of the DC power source is less than 14.3 Volts, then the comparison voltage may determine that the received DC voltage has a smaller magnitude than the reference voltage and the DC power source 305 is therefore the automobile cigarette lighter outlet.

The comparison circuitry 320 may output a signal $V_{data}$ based upon whether the DC power source is determined to be the automobile cigarette lighter outlet or the EMPOWER airplane outlet. For example, the comparison may output 5 Volts if the automobile cigarette lighter outlet is detected, and 0.0 Volts if the EMPOWER airplane outlet is detected. In alternative embodiments, different voltages for $V_{data}$ may be used. In additional embodiments, the comparison circuitry 320 may output a digital signal, such as a stream of bits, indicative of the DC power source 305. $V_{data}$ may be sent via cable 350 to the tip 330, and straight over to the electronic device 335. The electronic device 335 may include a controller 360 which is responsive to $V_{data}$. For example, if the electronic device 335 is a notebook computer and $V_{data}$ is indicative of the EMPOWER airplane outlet system, the controller 360 may disable battery charging circuitry 600, thereby preventing recharging of the batteries. And if the $V_{data}$ is indicative of the automobile cigarette lighter outlet as the DC power source 305, the controller 360 may enable battery charging circuitry to allow the batteries to be recharged.

Although FIG. 3 illustrates an adapter 340 which includes both a AC/DC adapter and a DC/DC adapter, other embodiments may include only a DC/DC adapter, and no AC/DC adapter.

Figure 4A:
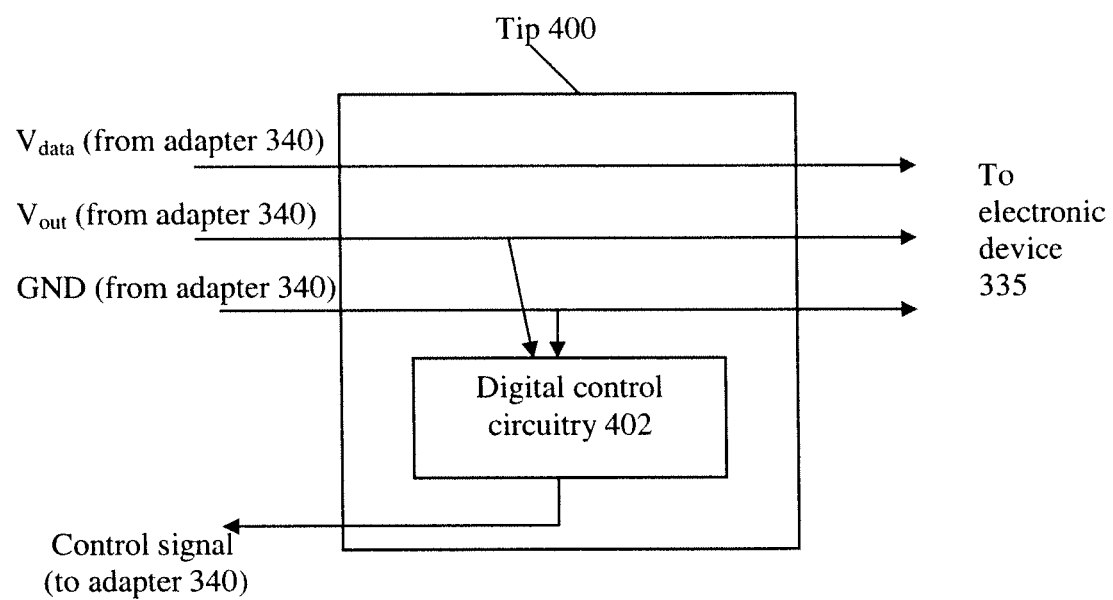
FIG. 4A illustrates a tip having digital control circuitry according to an embodiment of the invention.

FIG. 4A illustrates a tip 400 having digital control circuitry 402 according to an embodiment of the invention. As shown, the tip 400 receives $V_{data}$, $V_{out}$ and GND from the adapter 340 and allows them to all flow to the electronic device 335. The digital control circuitry 402 may receive the $V_{out}$ and GND signals and may output a control signal to the adapter 340 to set the magnitude of $V_{out}$ and limit the current provided. The control signal may be sent to the adapter 340 via the cable 350 between the tip 400 and the adapter 340. The digital control circuitry 402 may include a processor and a memory device, for example. In some embodiments, the tip 400 may be separable from cable 350, and in other embodiments, the tip 400 may be physically part of the cable 350.

Figure 4B:
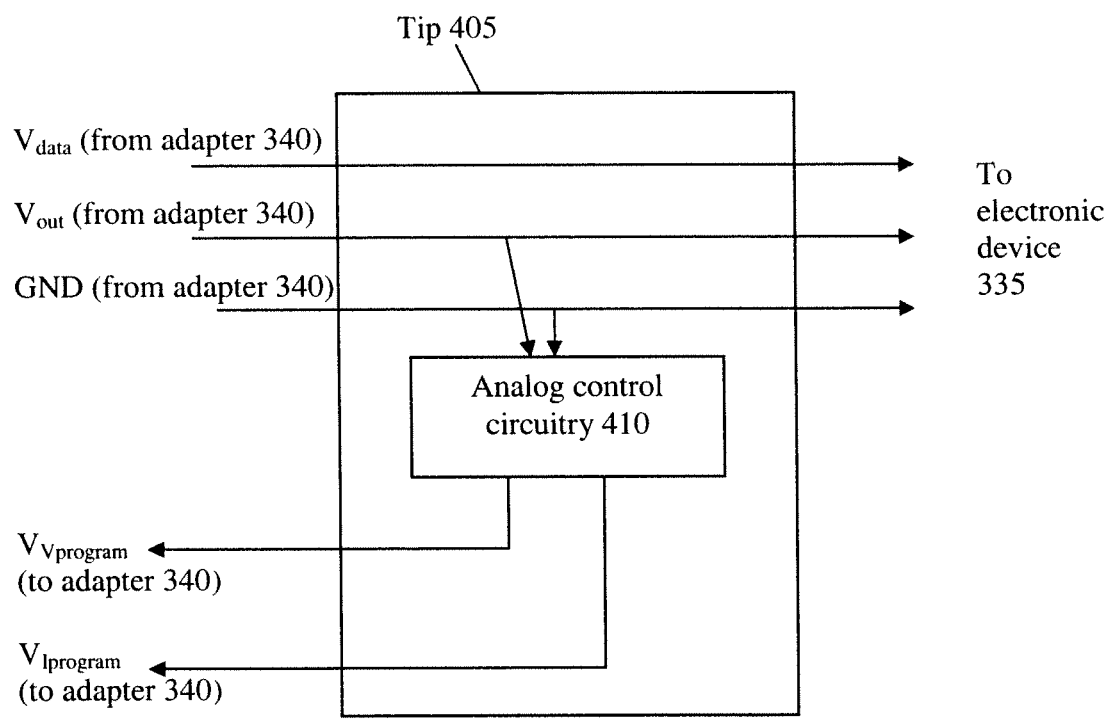
FIG. 4B illustrates a tip having analog control circuitry according to an embodiment of the invention.

FIG. 4B illustrates a tip 405 having analog control circuitry 410 according to an embodiment of the invention. As shown, the tip 405 receives $V_{data}$, $V_{out}$ and GND from the adapter 340 and allows them to all flow to the electronic device 335. The analog control circuitry 410 may receive the $V_{out}$ and GND signals and may output $V_{Vprogram}$ and $V_{Iprogram}$ to the adapter 340. $V_{Vprogram}$ and $V_{Iprogram}$ may be sent to the adapter 340 via the cable 350 between the tip 405 and the adapter 340. The analog control circuitry 400 may include passive or active components, for example. In some embodiments, the tip 400 may be separable from cable 350, and in other embodiments, the tip 400 may be physically part of the cable 350.

FIG. 5A illustrates comparison circuitry 320 according to an embodiment of the invention. As shown, the comparison circuitry 320 includes a comparator 500. The comparator 500 receives (a) the DC power signal from the DC power source 305, and (b) a reference voltage, $V_{ref}$. The comparator outputs $V_{data}$ based on whether the magnitude of the DC power from the DC power source exceeds $V_{ref}$, as described above with respect to FIG. 3.

FIG. 5B illustrates comparison circuitry 320 according to an additional embodiment of the invention. As shown, the comparison circuitry 320 includes a processor 505. The processor 505 receives (a) the DC power signal from the DC power source 305, and (b) value of a reference voltage stored in memory. The processor 505 then outputs $V_{data}$ based on whether the magnitude of the DC power from the DC power source exceeds $V_{ref}$, as described above with respect to FIG. 3. The processor 505 may output a single high or low voltage (e.g., 5.0 Volts or 0.0 Volts) based on the detected DC power source. Alternatively, the processor 505 may output a stream of bits to indicate the DC power source.

Figure 6:
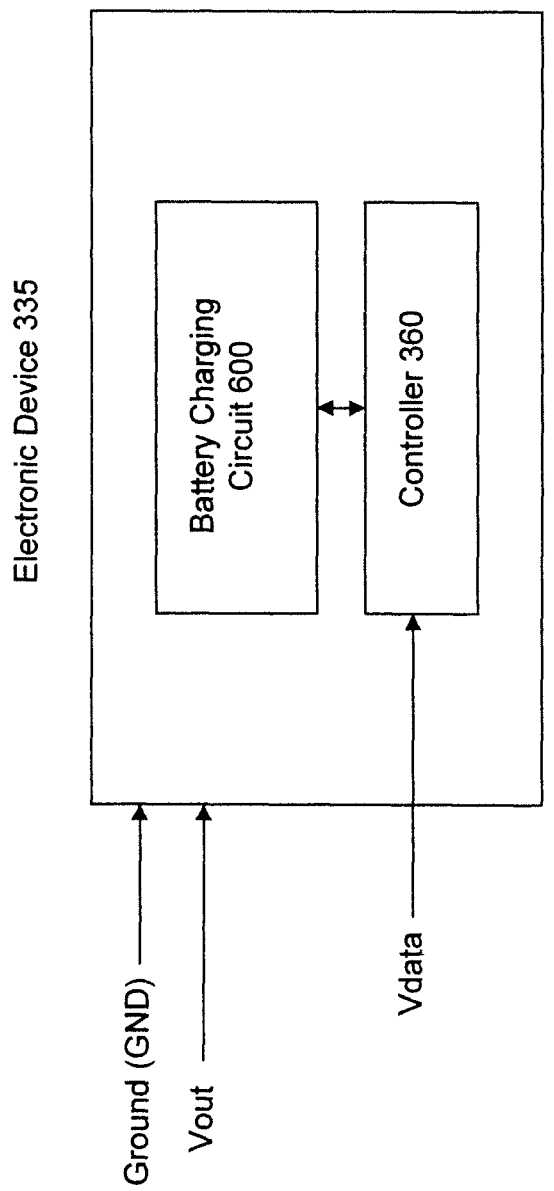
FIG. 6 illustrates an electronic device according to an embodiment of the invention.

FIG. 6 illustrates an electronic device 335 according to an embodiment of the invention. As shown, the electronic device 335 may receive GND, $V_{out}$ and $V_{data}$ from the tip 330. $V_{data}$ may be received by a controller 360. The controller 360 may disable battery charging circuitry 600 of the electronic device 335 from charging batteries when $V_{data}$ is indicative of the EMPOWER outlet. Alternatively, the controller 360 enables battery charging circuitry 600 so that the batteries of the electronic device may be charged based on the value of $V_{data}$.

FIG. 7A illustrates a method of determining and outputting $V_{data}$ according to an embodiment of the invention. The processing shown in FIG. 7A may be implemented by the adapter 340. First, DC power is received 700 from the DC power source 305. Next, the comparison circuitry determines 705 whether the magnitude of the voltage of the DC power received is greater than $V_{ref}$. If "no," the comparison circuitry determines the DC power source 305 to be an automobile cigarette lighter outlet, and processing proceeds to operation 710, where $V_{data}$ is output with a signal/voltage magnitude indicating that the DC power source 305 is the automobile cigarette lighter outlet. Processing then returns to operation 700. If "yes," at operation 705, processing proceeds to operation 715, where $V_{data}$ is output with a signal/voltage magnitude indicating that the DC power source 305 is the EMPOWER airplane outlet.

Figure 7B:
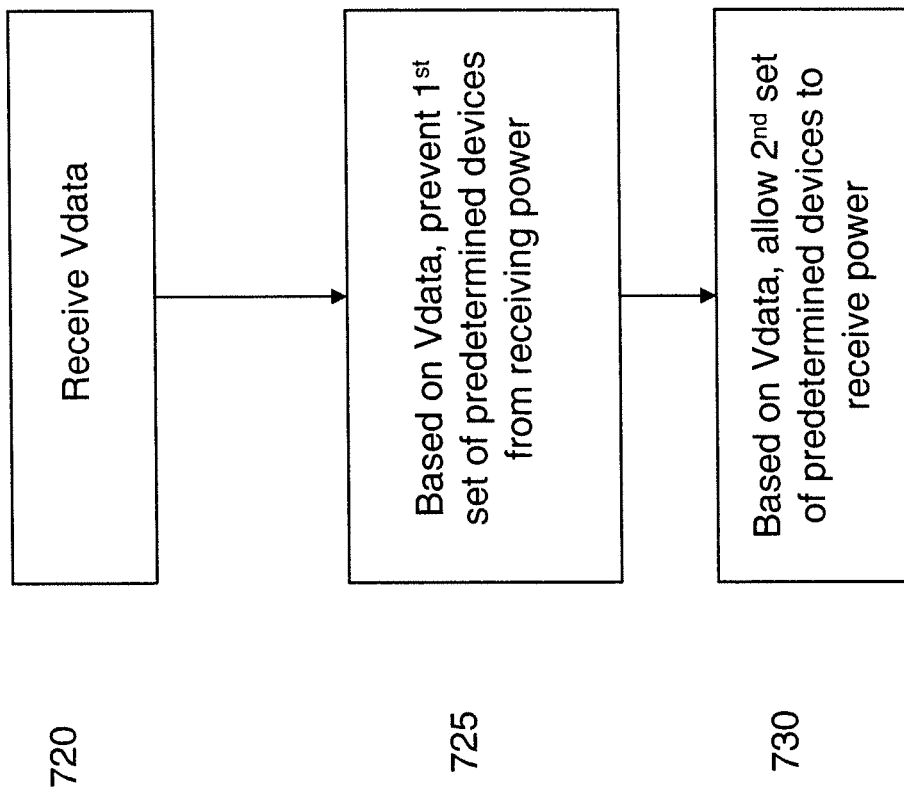
FIG. 7B illustrates a method of receiving $V_{data}$ and allowing power to flow to devices within the electronic device based on $V_{data}$ according to an embodiment of the invention.

FIG. 7B illustrates a method of receiving $V_{data}$ and allowing power to flow to devices within the electronic device 335 based on $V_{data}$ according to an embodiment of the invention. First, the electronic device 335 receives 720 the $V_{data}$ signal. As discussed above, the $V_{data}$ signal is sent from the adapter 340 through the tip 330 and over to the control circuitry 365 of the electronic device 335. Next, based on the $V_{data}$ signal, a first set of predetermined devices may be prevented 725 from receiving power. For example, if the electronic device 335 is a notebook computer, the control circuitry 365 may prevent batteries from recharging if $V_{data}$ indicates that the DC power source is the EMPOWER airplane outlet. Other devices/components in the electronic device 335 may also be prevented from receiving power or from functioning in a certain way.

At operation 730, a second set of predetermined devices may be allowed to receive power based on the Vdata signal. For example, if $V_{data}$ indicates that the DC power source is an automobile cigarette lighter outlet, then power may be available to batteries of the electronic device 335 to allow recharging. Other devices/components in the electronic device 335 may also be allowed to receive power or function in a particular way.

In embodiments described above, the V.sub.data signal may be used to send a signal to the control circuitry 365 indicating the DC power source. This signaling may be done via a discrete bit, an analog signal, a data signal line, an analog voltage, or via any other suitable manner. The V.sub.data signal may be transmitted from the adapter 340 to the tip 330 and electronic device 335 via a single signaling line or multiple signaling lines.

Figure 8:
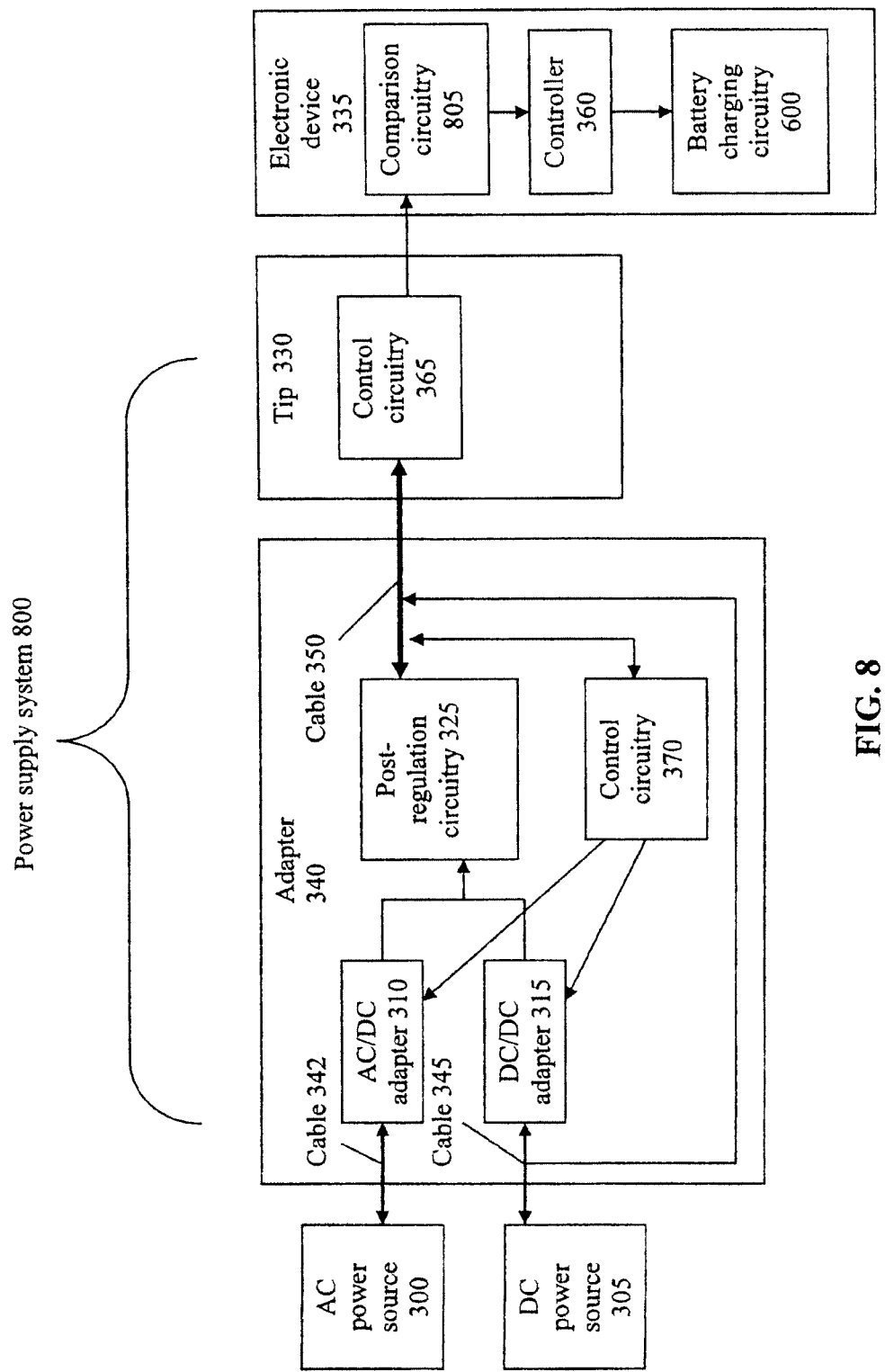
FIG. 8 illustrates a power supply system according to an embodiment of the invention.

FIG. 8 illustrates a power supply system 800 according to an embodiment of the invention. The power supply system 800 is similar to the power supply system 301 shown in FIG. 3. However, unlike the power supply system 301, in which the adapter 340 itself contains comparison circuitry 370, the adapter 340 of power supply system 800 does not contain the comparison circuitry 805. Instead, a regular adapter 340 may be used and the electronic device 335 itself includes the comparison circuitry 805 for determining the DC power source. The electronic device 335 may be a notebook computer and may implement the methods shown in FIGS. 7A and 7B.

Figure 9A:
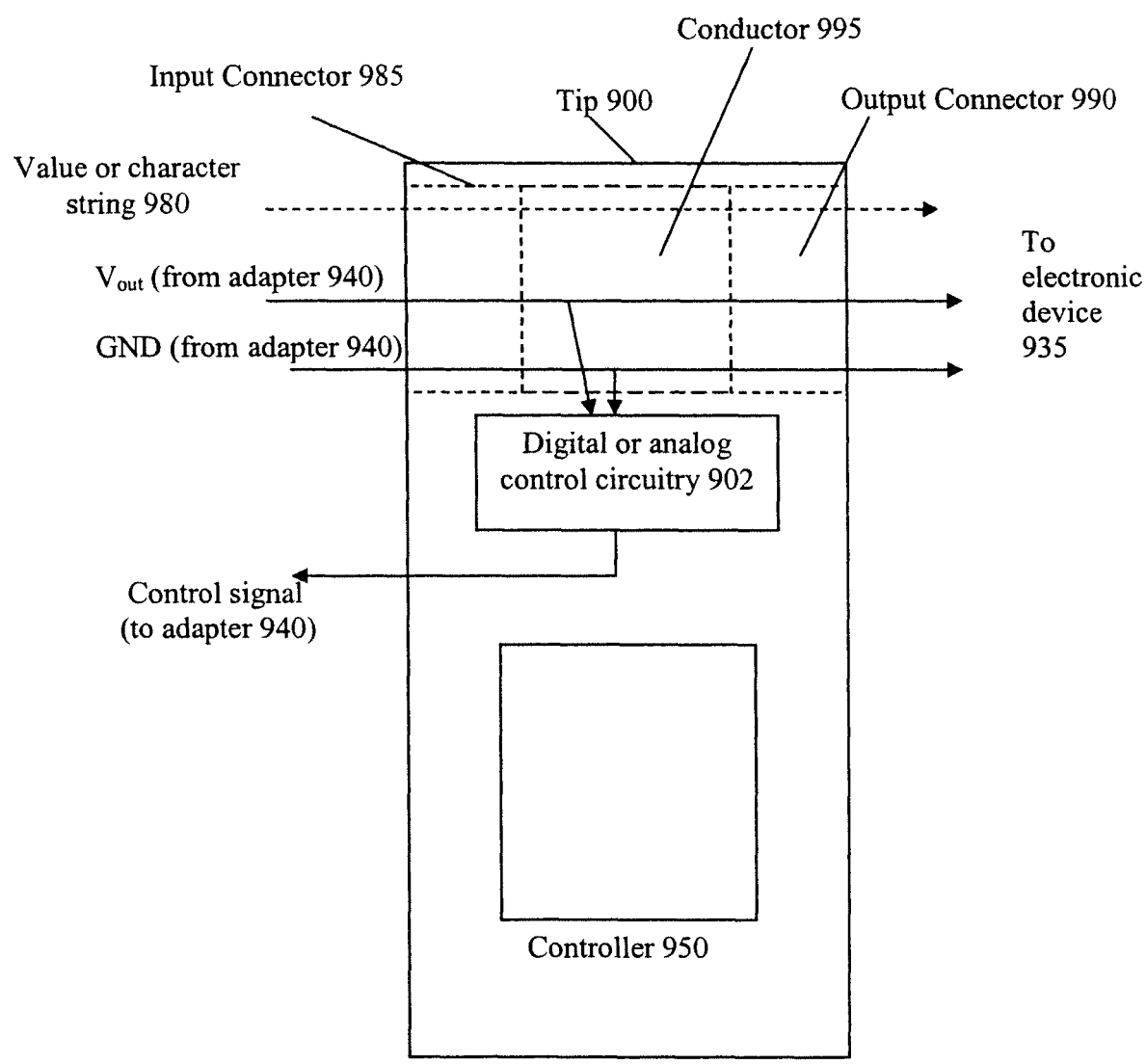
FIGS. 9A and 9B illustrate a tip including control circuitry according to embodiments of the invention.

FIG. 9A illustrates a tip according to an embodiment of the present invention. The tip 900 includes control circuitry 902 and a controller 950. The tip 900 is coupled to an adapter 940 and may have a cable disposed between the adapter 940 and the tip 900. The adapter 940 transmits V.sub.out and GND to the tip 900. In an embodiment of the invention, digital or analog control circuitry 902 transmits a programming signal or a control signal to the adapter 940. In an embodiment of the invention, digital or analog control circuitry 902 may transmit a plurality of programming signals to the adapter. Illustratively, digital or analog control circuitry 902 may transmit a voltage control signal to regulate the voltage output (Vout) from the adapter 940. The digital or analog control circuitry 902 may also transmit a current control signal to limit the current output from the adapter 940. The V.sub.out and GND signals are passed through the adapter 940 to the electronic device 935, such as a laptop, PDA, or cellular phone, to provide power to the electronic device.

In an embodiment of the invention, the tip 900 may also receive a value, which is illustrated by reference numeral 980 in FIG. 9A. The value may be representative of whether or not the power adapter is an approved adapter which can be connected to an electronic device 935. For example, for safety reasons, certain digital music player or laptop manufactures only desire to have certain manufacturers' power adapter connected to their system. Accordingly, the power adapter may transmit a value that indicates that the power adapter 940 is approved for powering the electronic device. Alternatively, the value may be representative of a maximum power output that is available at the time from the power adapter. For example, the value may represent that only 70 watts of power are available from the power adapter because the power adapter has been limited to that output power. Instead of receiving a value from the power adapter, the tip 900 may receive a character string. The character string may identify whether or not the power adapter is an approved adapter for powering the electronic device 935. The value or the character string may be received at input connector 985 of the tip 900. The input connector 985 may receive the value or character string and may pass through this signal or information to the output connector 990. Under certain operating conditions, there may be no modification of the value or character string in the tip 900. The output connector 990 is coupled to the electronic device 935 and passes the value or character string to the electronic device. A conductor 995 may couple the input connector 985 to the output connector 990

Figure 9B:
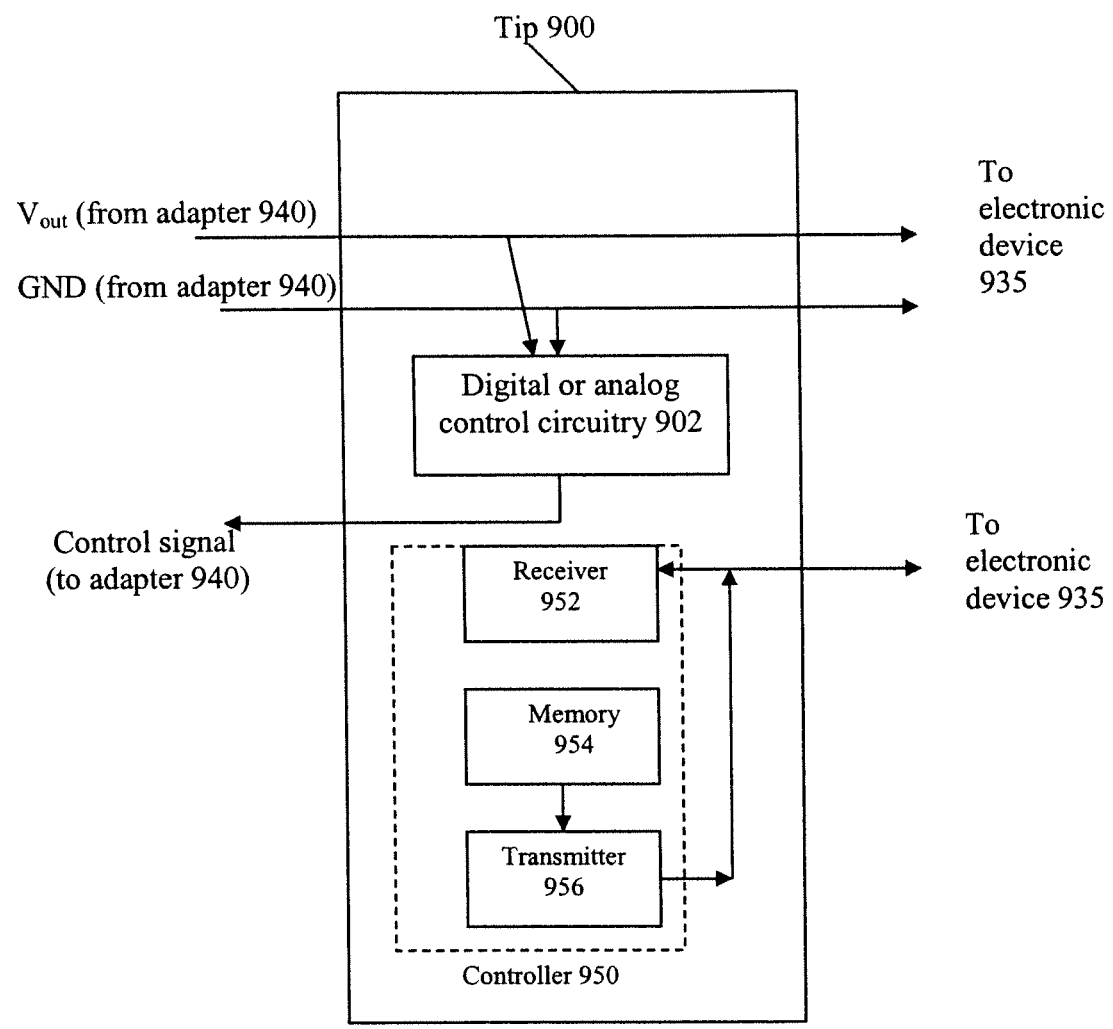

FIG. 9B illustrates an alternative embodiment of a tip according to an embodiment of the invention. In an embodiment of the invention, the tip 900 may include a controller 950, wherein the controller 950 includes a receiver 952, a memory 954, and a transmitter 956. In an alternative embodiment of the invention, a programmable Dallas Semiconductor programmable memory (i.e., DS2502) may be substituted for a controller and may include the receiver 952, memory 954, and transmitter 956. The receiver 952 may receive a signal from the electronic device 935. The signal may be a request from the electronic device 935 to interrogate the tip 900 and identify whether or not an approved power adapter 940 is coupled to the tip 900 and thus the electronic device 935. Once the controller 950 receivers the request from the electronic device 935, the controller 950 extracts a character string from the memory 954 and utilizes the transmitter 956 to transmit the character string to the electronic device 935. The character string is representative of the power adapter to which the tip 900 is coupled. In an embodiment of the invention, a microcontroller may be programmed and could be utilized in place of the transmitter 956, a receiver 952, and a memory 954. The character string may represent that the power adapter 940 and/or tip 900 is approved to be connected to the electronic device, e.g., a laptop or a cellular phone. Under certain operating conditions, the character string represents that a rechargeable battery within the electronic device can be charged by the power adapter 940 and tip 900 combination. Under certain operating conditions, the character string is indicative of a maximum power available from the power adapter. Under certain operating conditions, a value can be stored in the memory 954 where the value is indicative for the maximum power available from the power adapter. Illustratively, the value may be a power (or wattage) value or a current value.

The transmitter 956 may communicate with the electronic device 935 via a one-wire interface. The transmitter 956 may communicate with the electronic device 935 via other communication protocols, including serial communication protocols.

Figure 10:
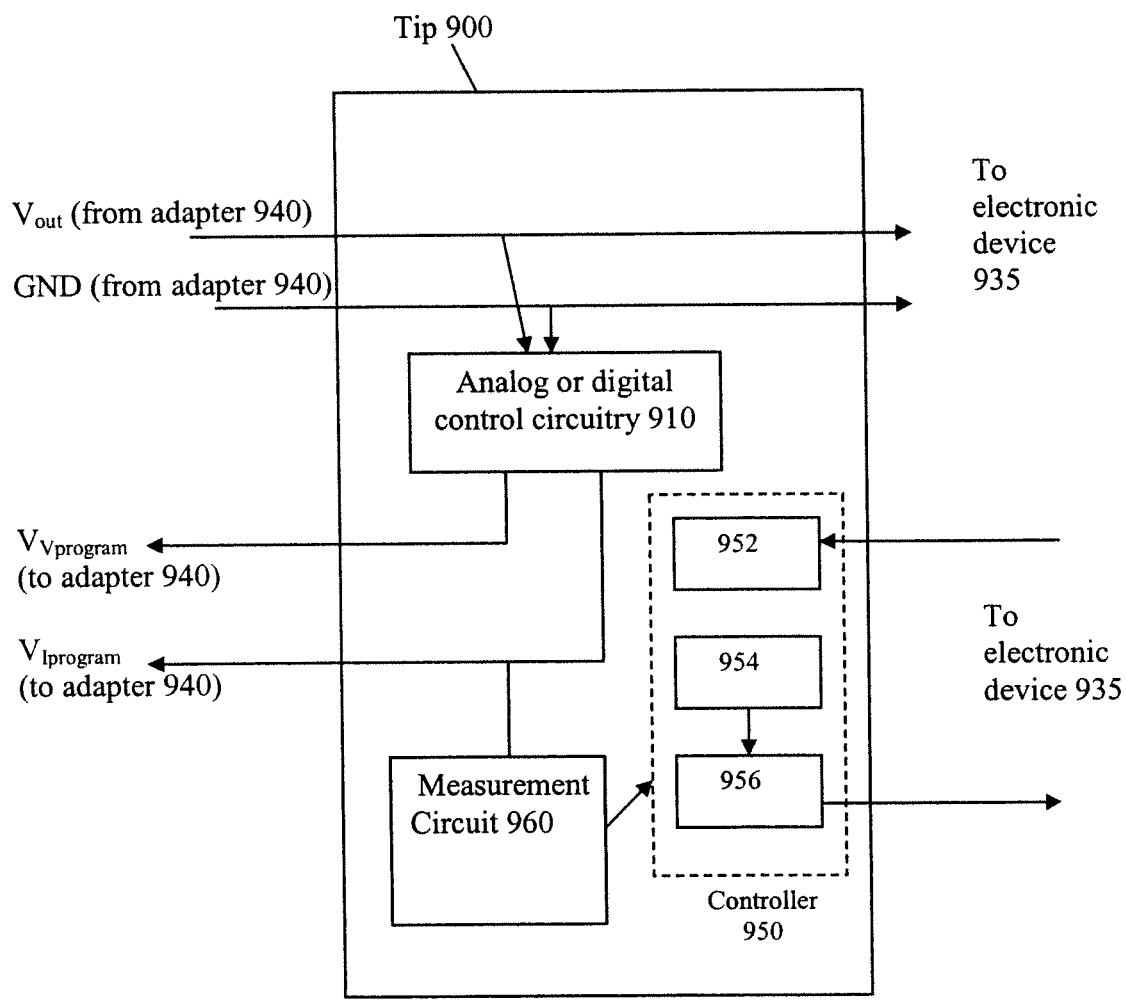
FIG. 10 illustrates a tip including control circuitry and a measurement circuit according to an embodiment of the invention.

FIG. 10 illustrates a second embodiment of a tip according to an embodiment of the invention. The tip 900 may include an analog or digital control circuitry 910, a controller 950, and measurement circuit 960 (e.g., a voltage sense circuit or a current sense circuit). The measurement circuit 960 may measure a magnitude level of a programming or control signal e.g., (V.sub.Iprogram), that is being transmitted to the power adapter 940. In an embodiment of the invention, the programming or control signal has a value representative of a maximum current available to be output by the adapter 940. For example, a voltage magnitude of the programming or control signal identifies a value of current (e.g., in amperes) that the power adapter is available to output. Illustratively, each 0.5 volts in the programming or control signal may represent one amp of current that the power adapter can output. A programming or control signal having a magnitude of 2.5 volts represents that the power adapter is limited to output 5 amperes and the power output is limited to 100 watts (if the fixed voltage output is 20 volts). The measurement circuit 960 may be implemented using a comparator or a number of comparators that compare a voltage level of the control signal to a reference voltage level or a number of reference voltages.

In an alternative embodiment of the invention, the measurement circuit 960 may be implemented by an analog-todigital converter. The analog-to-digital converter may measure a value of the control signal or the programming signal and identify the value which is representative of the power available to be output from the power adapter. In an embodiment of the invention, the analog-to-digital converter may be used in conjunction with a microcontroller. The analog-to-digital converter may be separate from the microcontroller or the analog-to-digital converter may be incorporated into the microcontroller.

The measurement circuit 960 takes the measured magnitude level of the programming or control signal and sends the information to the controller 950. A memory 954 may store a plurality of character strings. Alternatively, the memory 954 may store a plurality of values. Each of the plurality of character strings or values may represent a potential power output level of the power adapter 940. For example, one character string may be represent that the power adapter can output 90 watts while another character string represents that the power adapter can output 140 watts. The controller 950 receives the magnitude level of the programming/control signal from the measurement circuit 960 and selects the corresponding character string stored in the memory 954. Alternatively, the controller receives the magnitude level of the programming or control signal and selects the corresponding value stored in the memory 954.

After the corresponding character string or value is selected, the corresponding character string is transmitted to the electronic device 935 through the transmitter 956. The electronic device receives the character string and acts in response to the received character string or value. For example, the character string may indicate that the power adapter coupled to the tip (which is connected to the electronic device) can output 75 watts. Based on this information, a controller in an electronic device 935 (e.g., a laptop) may prevent the power adapter from charging the rechargeable battery within the electronic device 935 because the electronic device 935 may require all of the 75 watts of power.

The controller 950 may be a microcontroller. The controller 950 including the receiver 952, transmitter 956, and memory 954 may be a semiconductor memory chip such as a Dallas Semiconductor DS2502 programmable memory. The receiver 952 and transmitter 956 may communicate with the electronic device via a number of protocols, e.g., the one-wire interface communication protocols, a serial interface communication protocol, etc.

Figure 11:
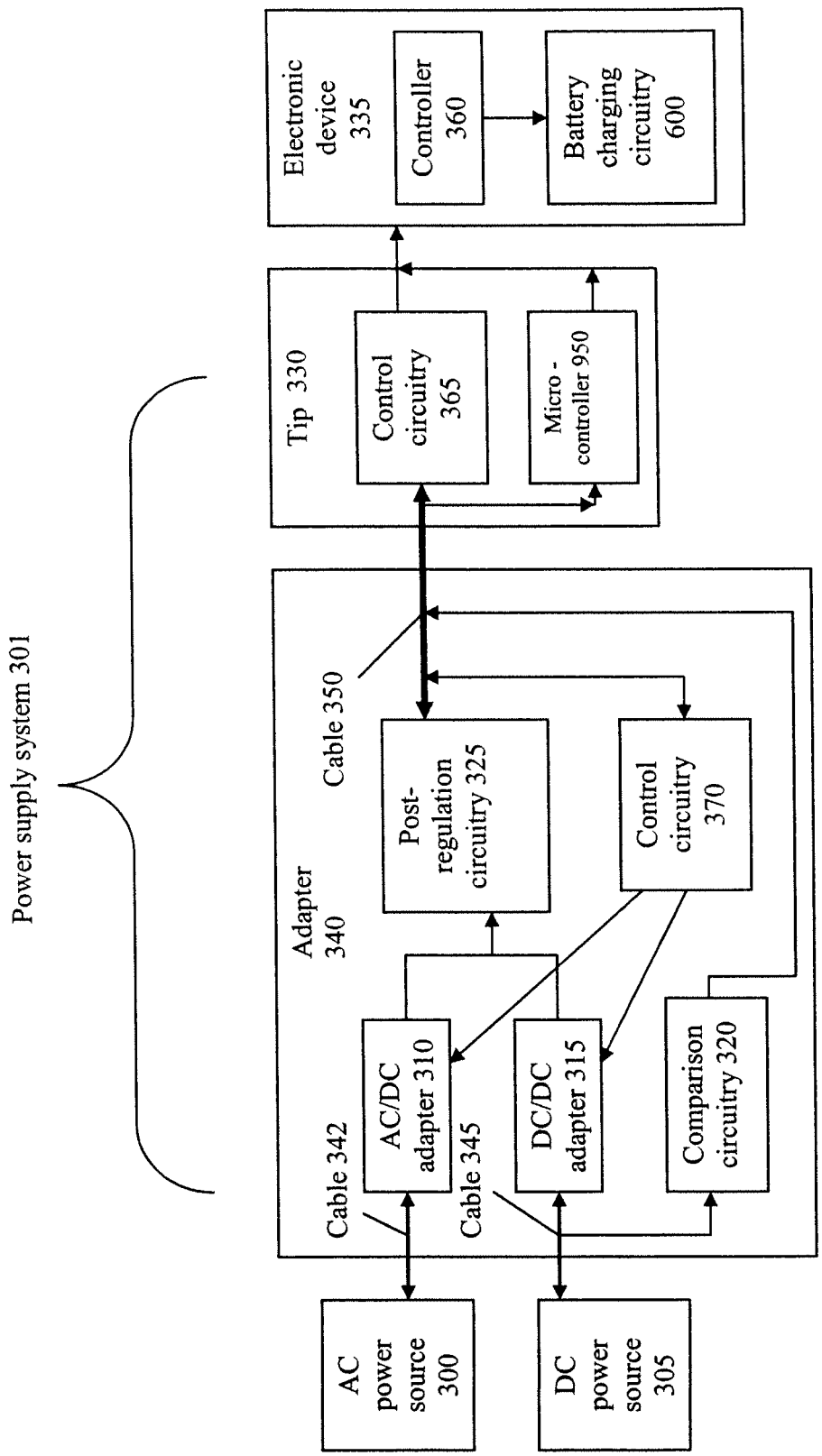
FIG. 11 illustrates a power supply system including a tip according to an embodiment of the invention.

FIG. 11 illustrates an alternative embodiment of a power supply system utilizing DC power source comparison circuitry according to an embodiment of the present invention. FIG. 11 is similar to the power supply system illustrated in FIG. 3 and also includes a microcontroller 950 in the tip 330. In FIG. 11, the microcontroller 950 receives a signal from the power adapter 340 in addition to the V.sub.out signal and ground signal. The power source determination signal may be referred to as a V.sub.data signal and may be generated by the comparison circuitry 320 in the adapter. The power source determination signal may identify a power capability of the external power source is an external automobile DC power source, an external AC power source, or an external airplane DC power source. For example, the power source determination signal may identify that the power adapter is connected to an external airplane DC power source and is limited to a number of watts of output, e.g., 50 or 60 watts of power. Alternatively, the power source determination signal may identify that the power adapter is connected to an external automobile power source, e.g., 90 watts or 100 watts.

The microcontroller 950 may receive the power source determination signal. Based on the received power source determination signal, the microcontroller 950 may extract a character string corresponding to the received power source determination signal from a memory. The memory 954 (see FIGS. 9A, 9B, and 10), as noted before, may store a number of character strings. Alternatively, the memory 954 may store a number of values and the microcontroller 950 may select one of the number of values. Although FIG. 11 does not illustrate that the microcontroller includes the memory 954, receiver 952, and transmitter 956, the microcontroller 950 may incorporate these components. Alternatively, the memory 954, receiver 952, and transmitter 956 may be located in devices outside of the controller 950 (e.g., not incorporated therein). The number of character strings or values may each represent a different power capability of the power adapters which can be coupled to the tip via a cable. Illustratively, one character string or value may represent a 90 watt power adapter, one character string may represent a 130 watt power adapter, one character string may represent a 70 watt power adapter, and one character string may represent that the power adapter has a limited power supply capability, e.g., less than 70 watts.

In an embodiment of the invention, no character string or value may be transmitted if the power adapter cannot generate a certain wattage of power. This may represent that the power adapter and tip cannot be utilized to charge the battery of the electronic device. The microcontroller 950 may transmit the selected character string to the electronic device. A controller 360 in the electronic device may receive the selected character string and may perform a plurality of actions based on the selected character string. For example, if the selected character string identifies that the power adapter has a limited power capability, e.g., less than 50 watts or 70 watts, the controller 360 may place the electronic device in a mode of low power consumptions, e.g., turning off display earlier or not allowing charging of the battery in the electronic device. Under other operating conditions, the character string or value may identify that an AC adapter is the external power source and can provide 130 Watts, and the controller 360 may allow the battery in the electronic device to be charged by the power adapter and place the electronic device in a high power consumption mode, e.g., brightness of screen and hard drive.

Under certain operating conditions, rather than a character string, the microcontroller 950 may have a number of current levels that represent different power capabilities of adapters. Illustratively, in other words, a first current level may represent that the power adapter 340 can supply 130 watts, a second current level may represent that the power adapter 340 can supply 90 watts, a third current level represents that the power adapter 340 can supply 70 watts, and a fourth current level may represent the power adapter 340 supplies less than 70 watts.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed are:

1. A portable electronic device comprising:
a rechargeable battery;
power circuitry configured to receive direct current and to charge the rechargeable battery; and
data circuitry configured to provide a first signal to a power supply and to receive a second signal from the power supply, the data circuitry and the power circuitry configured to be coupled via a connector to the power supply, the connector comprising a first conductor, a second conductor, a third conductor, and a fourth conductor, the connector configured to be detachably mated with an interface of the power supply to:
transfer, via the first conductor, the direct current from the power supply,
provide, via the second conductor, a ground reference from the power supply,
communicate, via the third conductor, the first signal from the data circuitry to the power supply, and
communicate, via the fourth conductor, the second signal from the power supply to the data circuitry;
wherein the second signal has a parameter level that is usable by the data circuitry in connection with control of charging the rechargeable battery based on the direct current received by the power circuitry.

2. The portable electronic device of claim 1 wherein the connector is disposed at an end of a cable.

3. The portable electronic device of claim 2 wherein the connector is removable from the end of the cable.

4. The portable electronic device of claim 1 wherein the connector is operatively coupled to the data circuitry and to the power circuitry by a circuit board.

5. The portable electronic device of claim 1 wherein the parameter level of the second signal is used by the data circuitry to determine a power level of the direct current available from the power supply.

6. The portable electronic device of claim 1 wherein the parameter level of the second signal comprises a voltage level.

7. The portable electronic device of claim 1 wherein the first signal is provided by the data circuitry in response to the power circuitry receiving the direct current from the power supply.

8. The portable electronic device of claim 1 wherein the portable electronic device is a computer.

9. The portable electronic device of claim 1 wherein the portable electronic device is a phone.

10. The portable electronic device of claim 1 wherein the portable electronic device is a digital music player.

11. A portable electronic device comprising:
a rechargeable battery;
power circuitry configured to receive direct current power and to charge the rechargeable battery; and
data circuitry configured to provide an output signal to a power supply and to receive an input signal from the power supply, the data circuitry and the power circuitry configured to be coupled via a connector to the power supply, the connector comprising a first conductor, a second conductor, a third conductor, and a fourth conductor, the connector configured to be detachably mated with an interface of the power supply to:
transfer, via the first conductor, the direct current power from the power supply, provide, via the second conductor, a ground reference from the power supply,
transmit, via the third conductor, the output signal from the data circuitry to the power supply, and
receive, via the fourth conductor, the input signal from the power supply to the data circuitry;
wherein the input signal is usable by the data circuitry in connection with control of charging the rechargeable battery based on the direct current power received by the power circuitry.

12. The portable electronic device of claim 11 wherein the connector is disposed at an end of a cable.

13. The portable electronic device of claim 12 wherein the connector is removable from the end of the cable.

14. The portable electronic device of claim 11 wherein the connector is coupled to the data circuitry and to the power circuitry by a circuit board.

15. The portable electronic device of claim 11 wherein the input signal comprises a parameter level used by the data circuitry to determine a power level of the direct current power available from the power supply.

16. The portable electronic device of claim 15 wherein the parameter level of the input signal is a voltage level.

17. The portable electronic device of claim 11 wherein the output signal is provided to the power supply in response to the power circuitry receiving the direct current power from the power supply.

18. The portable electronic device of claim 11 wherein the portable electronic device is a computer.

19. The portable electronic device of claim 11 wherein the portable electronic device is a phone.

20. The portable electronic device of claim 11 wherein the portable electronic device is a digital music player.

* * * * *